United States Patent

Kumazawa et al.

[11] Patent Number: 5,815,217
[45] Date of Patent: Sep. 29, 1998

[54] SCENE-CHANGE DETECTOR FOR A MOVING IMAGE COMPOSED OF A PLURALITY OF FRAMES

[75] Inventors: Hiroyuki Kumazawa; Minoru Ozaki, both of Hyogo, Japan

[73] Assignee: Mitsubishi Denki Kabushiki Kaisha, Tokyo, Japan

[21] Appl. No.: 787,449

[22] Filed: Jan. 22, 1997

Related U.S. Application Data

[63] Continuation of Ser. No. 24,739, Mar. 1, 1993, abandoned.

[30] Foreign Application Priority Data

| Mar. 6, 1992 | [JP] | Japan | 4-083049 |
| May 7, 1992 | [JP] | Japan | 4-141089 |
| Dec. 9, 1992 | [JP] | Japan | 4-351615 |

[51] Int. Cl.$^6$ ..................... H04N 7/18
[52] U.S. Cl. ............. 348/700; 348/699; 348/416; 348/415; 348/413
[58] Field of Search ............... 348/416, 409, 348/411, 412, 699, 700, 405, 401, 420, 150, 151, 152, 415

[56] References Cited

U.S. PATENT DOCUMENTS

| 4,698,672 | 10/1987 | Chen et al. | 348/416 |
| 4,858,005 | 8/1989 | Lodge | 358/135 |
| 4,885,636 | 12/1989 | Sullivan | 358/133 |
| 4,942,467 | 7/1990 | Waldman et al. | 348/416 |
| 5,028,996 | 7/1991 | Takahashi et al. | 348/416 |
| 5,057,921 | 10/1991 | Robert et al. | 348/700 |
| 5,150,432 | 9/1992 | Ueno et al. | 348/405 |
| 5,151,784 | 9/1992 | Lavagetto et al. | 348/416 |
| 5,164,828 | 11/1992 | Tahara et al. | 348/700 |
| 5,227,878 | 7/1993 | Puri et al. | 348/700 |
| 5,258,836 | 11/1993 | Murata | 348/419 |
| 5,327,173 | 7/1994 | Nishizawa et al. | 348/700 |
| 5,347,309 | 9/1994 | Takahashi | 348/401 |
| 5,457,496 | 10/1995 | Hamano et al. | 348/415 |
| 5,497,338 | 3/1996 | Miyake et al. | 348/419 |

FOREIGN PATENT DOCUMENTS

| 2-174387 | 7/1990 | Japan | H04N 7/137 |
| 2-174388 | 7/1990 | Japan | H04N 7/137 |
| 2-254887 | 10/1990 | Japan | H04N 7/13 |
| 4-354488 | 5/1991 | Japan | H04N 7/133 |
| 4-345382 | 12/1992 | Japan | H04N 5/262 |
| 5-284369 | 10/1993 | Japan | H04N 1/415 |

OTHER PUBLICATIONS

Nagasaka & Tanaka "Automatic Scene–Change Detection Method for Video Works" Information Processing Society of Japan.

Otsuji, Tonomura & Ohba "Video Scene Analysis by Brightness" Electronic Information Communication Society.

Fuji, Mori & Tamura, "An Automatic Scene–Change Detection Method" Electronic Information Communication Society.

*Primary Examiner*—Tommy P. Chin
*Assistant Examiner*—Anand S. Rao
*Attorney, Agent, or Firm*—Wolf, Greenfield & Sacks, P.C.

[57] ABSTRACT

A scene-change detector is disclosed which detects a scene-change of a moving image composed of a plurality of frames. In the apparatus, a moving image is encoded based on the correlation between frames or inside a frame. The energy of an estimation error between frames in the case of encoding is operated by image elements. The energy is totaled by frames, and when the totaled value is larger than a specified value, a signal expressing a scene-change is output.

4 Claims, 25 Drawing Sheets

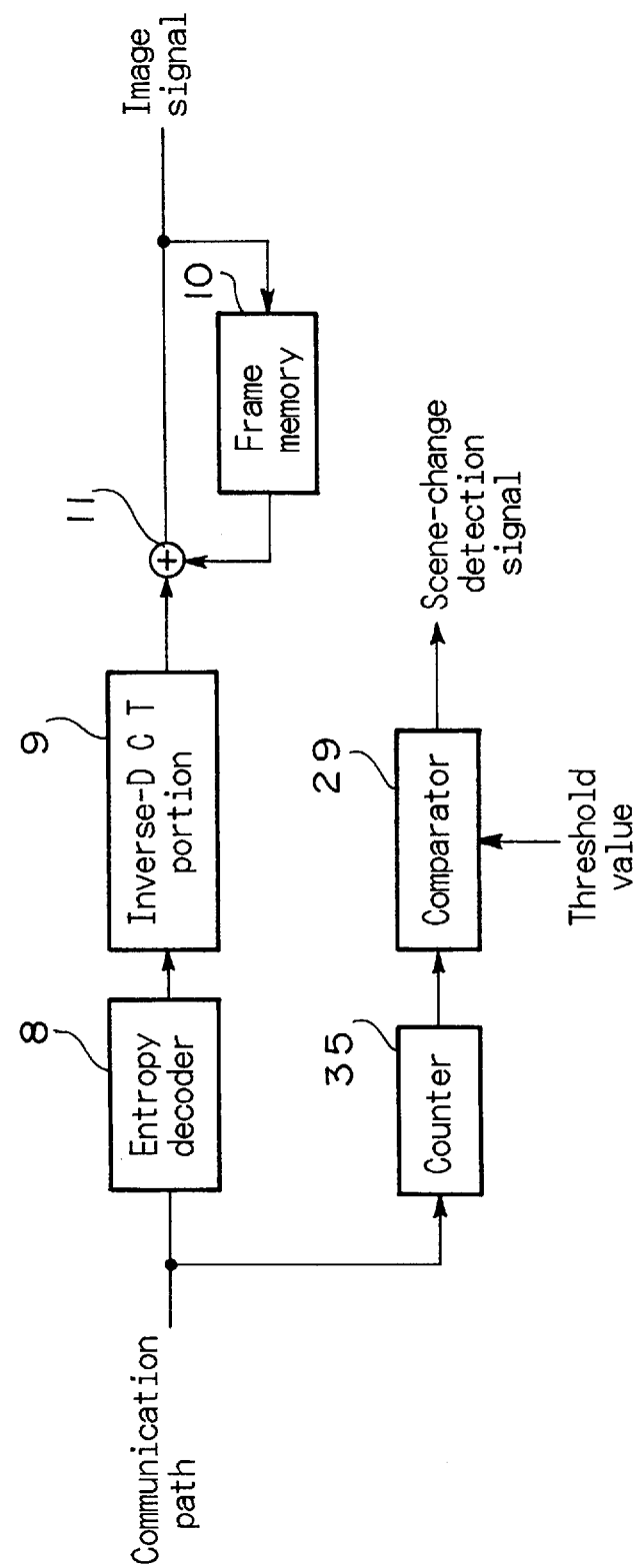
F I G. 14

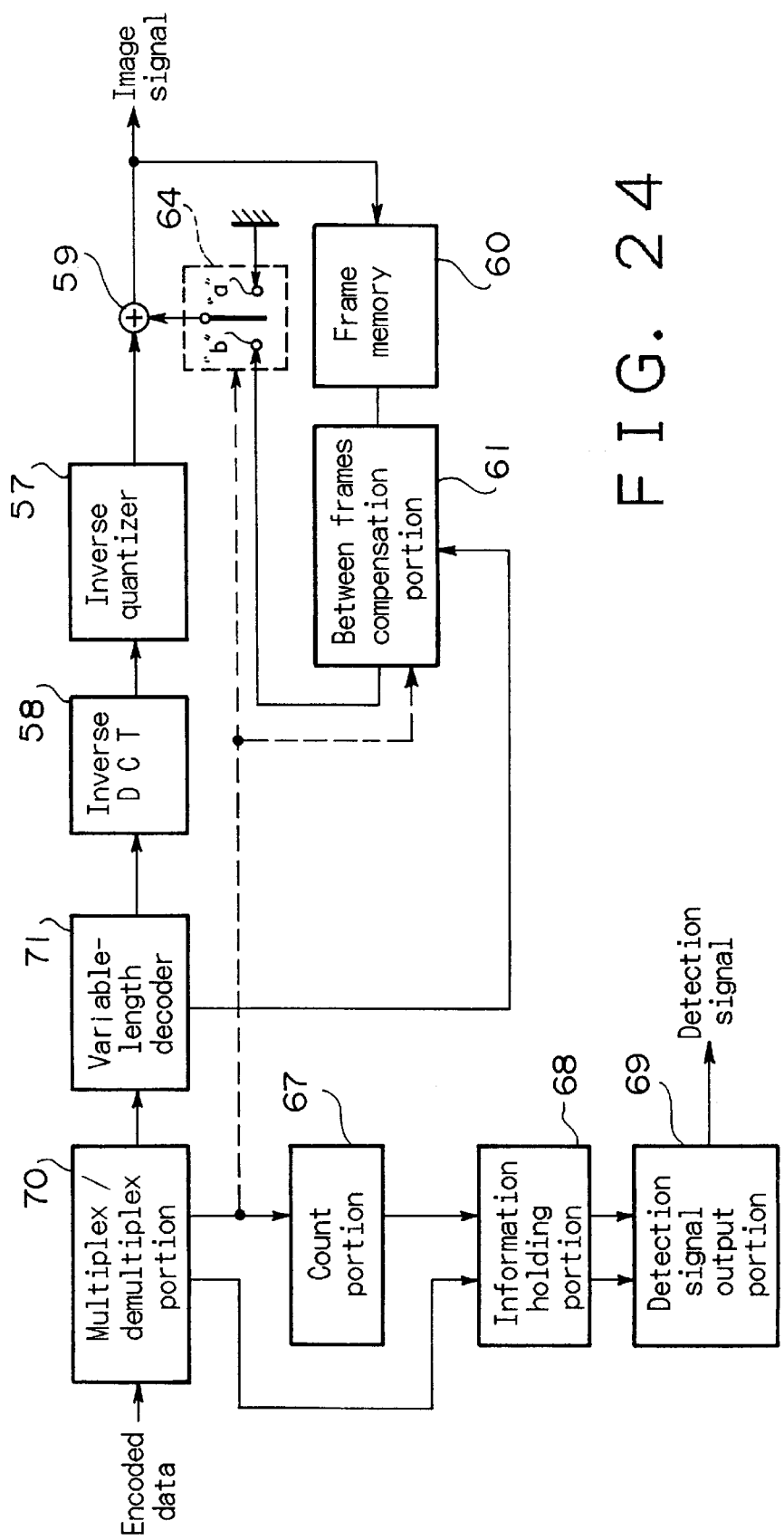
F I G. 24

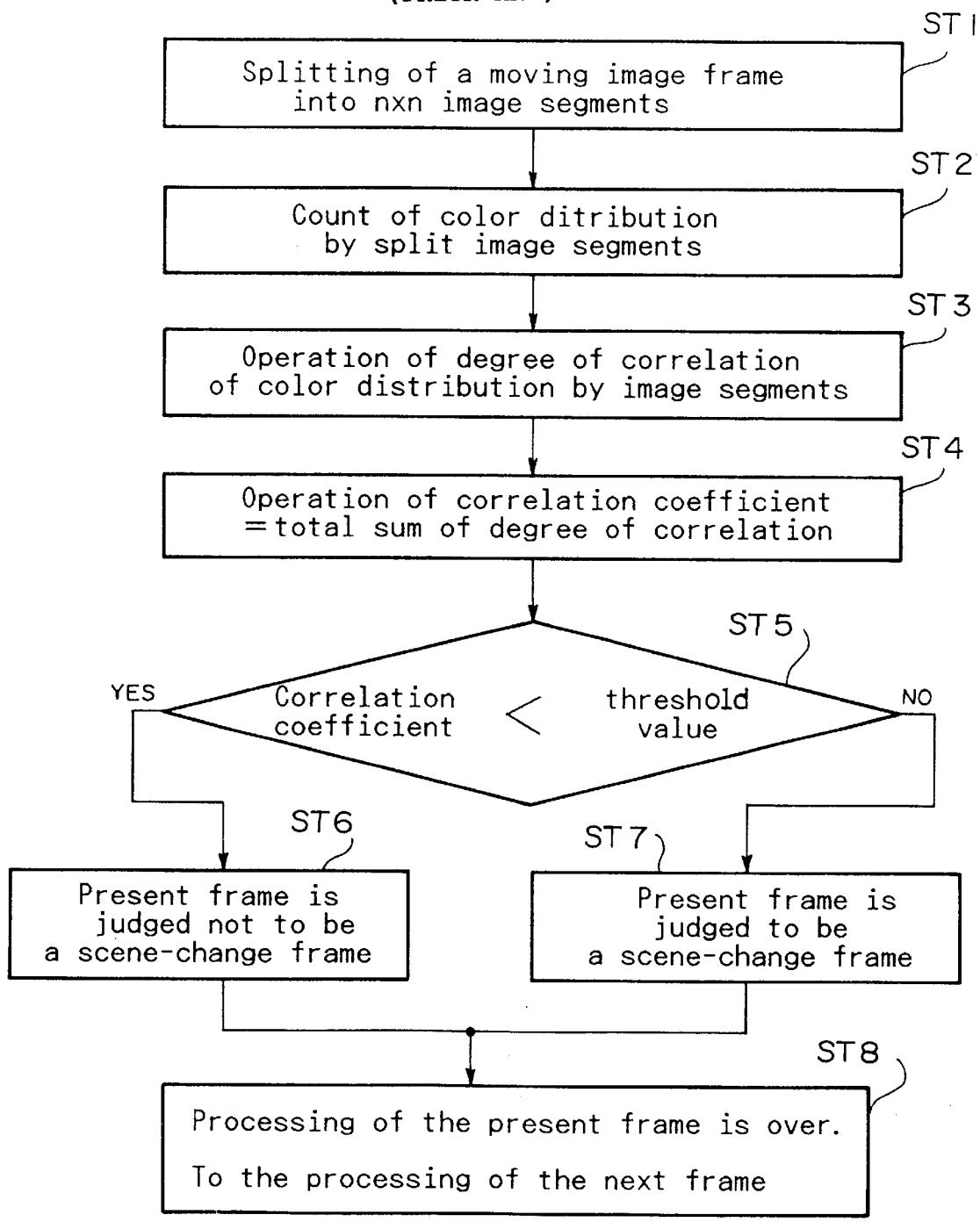

5,815,217

SCENE-CHANGE DETECTOR FOR A MOVING IMAGE COMPOSED OF A PLURALITY OF FRAMES

This application is a continuation of application Ser. No. 08/024,739, filed Mar. 1, 1993, now abandoned.

BACKGROUND OF THE INVENTION

1. Field of the Invention

The present invention relates to a scene-change detector which automatically detects a frame having a scene change out of a moving image composed of a plurality of scenes.

2. Description of the Prior Art

FIG. 25 is a block diagram showing an example of an encoder and a decoder for a moving image of a predictive encoding system to which a conventional scene-change detector is to be applied. In the FIGURE, 1 is a frame memory storing the image data for 1 frame of the immediately preceding frame, and 2 is a subtracter for calculating the difference between the input image data and the image data stored in the frame memory 1. Number 3 is a DCT portion for performing discrete cosine transformation of the output of the subtracter 2, 4 is a quantizer for quantizing the transformed signal in the DCT portion 3, and 5 is an entropy encoder which encodes the quantized signal in the quantizer 4 and transmits the signal to a communication path.

Number 6 is an inverse-DCT portion which performs inverse discrete cosine transformation (hereinafter referred to as inverse DCT) being opposite to the operation of the DCT portion 3, and 7 is an adder which adds the inverse-DCT processed signal in the inverse-DCT portion 6 to the image data of the preceding frame stored in the frame memory 1 and restores the added data in the frame memory 1. An encoder for a moving image is composed of these portions.

Number 8 is an entropy decoder for decoding the encoded data which is transmitted to the communication path from the encoder, and 9 is an inverse-DCT portion which executes an inverse-DCT process for the decoded signal in the entropy decoder 8. Number 10 is a frame memory in which the image data for one immediately preceding frame are stored, and 11 is an adder which adds the image signal processed by inverse-DCT process in the inverse-DCT portion 9 to the image data stored in the frame memory 10 to reproduce an image signal. The encoder for a moving image is constituted of these portions.

Next, operation will be explained. The difference between the image signal input to the encoder for a moving image and the image data of the immediately preceding frame stored in the frame memory 1 is calculated in the subtracter 2 image element by image element positioned in corresponding positions. The subtraction result calculated by the subtracter 2 is transmitted to the DCT portion 3 and it is divided into 2 dimensional blocks of proper sizes (normally, a block in the order of 8×8 image elements), and DCT process is given to each block. The calculated result in the DCT portion 3 is transmitted to the quantizer 4 and is quantized after being approximated by a finite number of representative values. The represented values output from the quantizer 4 are transmitted to the entropy encoder 5 and the inverse-DCT portion 6 to be processed in respective portions.

At first, the entropy encoder 5 encodes the representative values received from the quantizer 4, allotting variable length codes to the representative, the length corresponding to the occurrence frequency (In general, a shorter code is given to a quantizer output of higher frequency.) and the encoded data are transmitted to the communication path. In this case, it is assumed that the term "communication path" indicates an actual communication path or a memory medium. This can be applied to the following explanation too.

In the inverse-DCT portion 6, an inverse-DCT processing, an opposite operation to that in the DCT portion 3, is given to the output from the quantizer 4, and the result is transmitted to the adder 7. In the adder 7, the image elements in the corresponding positions in the output of the inverse-DCT portion 6 and in the data of the preceding frame stored in the frame memory 1 are added image element by image element, and the addition result is restored in the frame memory 1. When the processing of data for 1 frame is finished, the image data of the present frame is reformed in the memory frame 1, and the data are utilized as the image data of the immediately preceding frame in a predictive processing of the next frame.

In the decoder for a moving image, the encoded data received from a communication path are encoded into variable length data by a method called entropy encoding corresponding to the occurrence probability (In general, a shorter code is allotted for higher occurrence probability.). In an entropy decoder 8, decoding of the entropy-encoded data is performed. The decoded data are transformed to the data in a frequency area by a DCT processing. Therefore, the data are transmitted to the inverse-DCT portion 9 to be transformed to the data in the time area. The image elements in the corresponding positions in the image data of an immediately preceding frame stored in the frame memory 10 and in the output of the inverse-DCT portion 9 are added image element by image element in the adder 11. The addition result is output as the image signal of the present frame, and also utilized for the decoding of the next frame being stored in the frame memory 10.

In this case, it is assumed for convenience that the output of the quantizer 4 is not the number of a fixed length allotted to a representative value but it is the representative value itself; the assumption, however, does not harm generalization. In the following also, explanation will be given assuming that the output of the quantizer 4 is a representative value itself.

Recently according to the progress in multimedia processing technology, it is an essential condition for multimedia that moving images can be freely handled by a computer. A moving image can be understood as a continuation of still images of several tens of frames per second, and moreover taking a wider view of the matter mentioned in the above, it can be also understood as a continuation of scenes constituted of a plurality of continuing frames. From the view point of handling a moving image with an information processor called a computer, it is more convenient to grasp a moving image as a continuation of scenes, in which each scene has a meaning, than to grasp it as a continuation of frames.

For example, the editing of a moving image is a work to make up a screen image intended by an editor as a whole using photographed moving images as image materials by cutting and joining the materials. In the editing work, in general, a scene having a meaning can be a basic unit of editing. When the editing of a moving image was performed with a computer, in the past, a skilled person used to discriminate a scene change, and the editing was performed based on the result of discrimination. In this case, a computer was used only as a tool for offering editing circumstances as a simple man-machine interface.

In the near future, the multimedia technology will widely spread out into the society and further into families, in such a state of things, it will be necessary to consider that the editing of a moving image with a computer will be performed by amateurs not only by skilled persons. In such a case, it is desirable that a computer manages a moving image as a set of scenes, and further it is desirable that the computer recognizes automatically the changing points of scenes and utilizes the results.

FIG. 26 is a flow chart showing the algorithm of a conventional scene-change detector which is shown in a paper, 1Q-5(pp 642 to 643 in the collection of preliminary manuscripts) on "Automatic detection method of a scene change in a video work", read in the fortieth all Japan meeting of The Institute of Information Processing Engineers of Japan (the first term of 1990). In the FIGURE, ST1 is a split processing of a screen, ST2 is a count processing of color distribution, ST3 is a compute processing of the degree of correlation, ST4 is a compute processing of the coefficient of correlation, ST5 is a comparison processing with a threshold value, ST6 is a judgment processing for a scene change, ST7 is a judgment processing for a non-scene-change, and ST8 is a transition processing to the next frame.

Next, explanation of operation will be given. At first, in step ST1, a frame of a moving image is split into $n \times n = n^2$ image segments, and in step ST2, the distribution of colors in each split image segment is measured. In step ST3, the degree of correlation of color distribution between respective split image segments positioned in the corresponding positions in the preceding frame and in the present frame is found. Various ways can be considered for expressing the degree correlation, and in this case, statistical quantity of square of X, $Xk^2$ ($k=1, 2, ---n^2$), as shown in the equation below will be used.

$$Xk^2 = \sum_i \{(Yi - mi)^2/mi\} \quad (1)$$

In equation (1), mi is the distribution of a color i in a split image segment of the present frame, and Yi is the distribution of the color i in a corresponding split image segment of the preceding frame. In step ST4, correlation coefficient r is obtained in calculating the total sum of correlation degree by the following equation.

$$r = \sum_{k=1}^{n^2} Xk^2 \quad (2)$$

Next, in step ST5, the correlation coefficient r is compared with a threshold value which is set beforehand, and it is judged whether the present frame is a scene-change frame or not in step ST6 or in step ST7 according to the comparison result, and after that, the processing is transferred to the next frame in step ST8.

Since a conventional scene-change detector is constituted as described in the above, complicated processing such as the investigation of color distribution for every frame and also the finding of correlation coefficient between frames have to be performed. When such processing are executed by a widely used processor, real time processing is impossible, and in order to realize the real time processing of automatic detection of a scene change, a hardware unit of exclusive use has to be provided, and further digitizing of a moving image is also considered for the handling of a moving image with a computer. Moreover, in order to decrease an enormous data quantity of a digital moving image, it is considered that the image data are taken into the inside of a computer after the data quantity is decreased by an encoding technology for a moving image. In this case too, the processing is independent of encoding/decoding of a moving image in a conventional way of processing. Therefore, there has been a problem that in the case of encoding or decoding of a moving image, in spite of the execution of complicated processing spreading over the frames, the result cannot be utilized and complicated processing have to be executed before the encoding of a moving image or after the decoding of an image signal.

SUMMARY OF THE INVENTION

An object of the present invention is to offer a scene-change detector which is able to detect a scene change of a moving image without using complicated processing.

The present invention is accomplished to achieve the above-mentioned object, and it comprises: a means for encoding a moving image based on the correlation between frames, a means for executing a specified operation for the prediction error between frames in the case of encoding image element by image element, a means for summing up the specified operation results frame by frame, and a means for outputting a signal showing a scene change when the summed up value is larger than a specified value.

Therefore, a scene change of a moving image can be detected without using complicated processing such as those for color distribution.

BRIEF DESCRIPTION OF THE DRAWINGS

FIG. 14 is a block diagram showing the constitution of embodiment 23 according to the present invention.

FIG. 24 is a block diagram showing the constitution of embodiment 38 according to the present invention.

FIG. 26 is a flow chart showing the algorithm for the detection of a scene change in the case of a conventional scene-change detector.

DETAILED DESCRIPTION OF THE PREFERRED EMBODIMENTS

Figure 1:
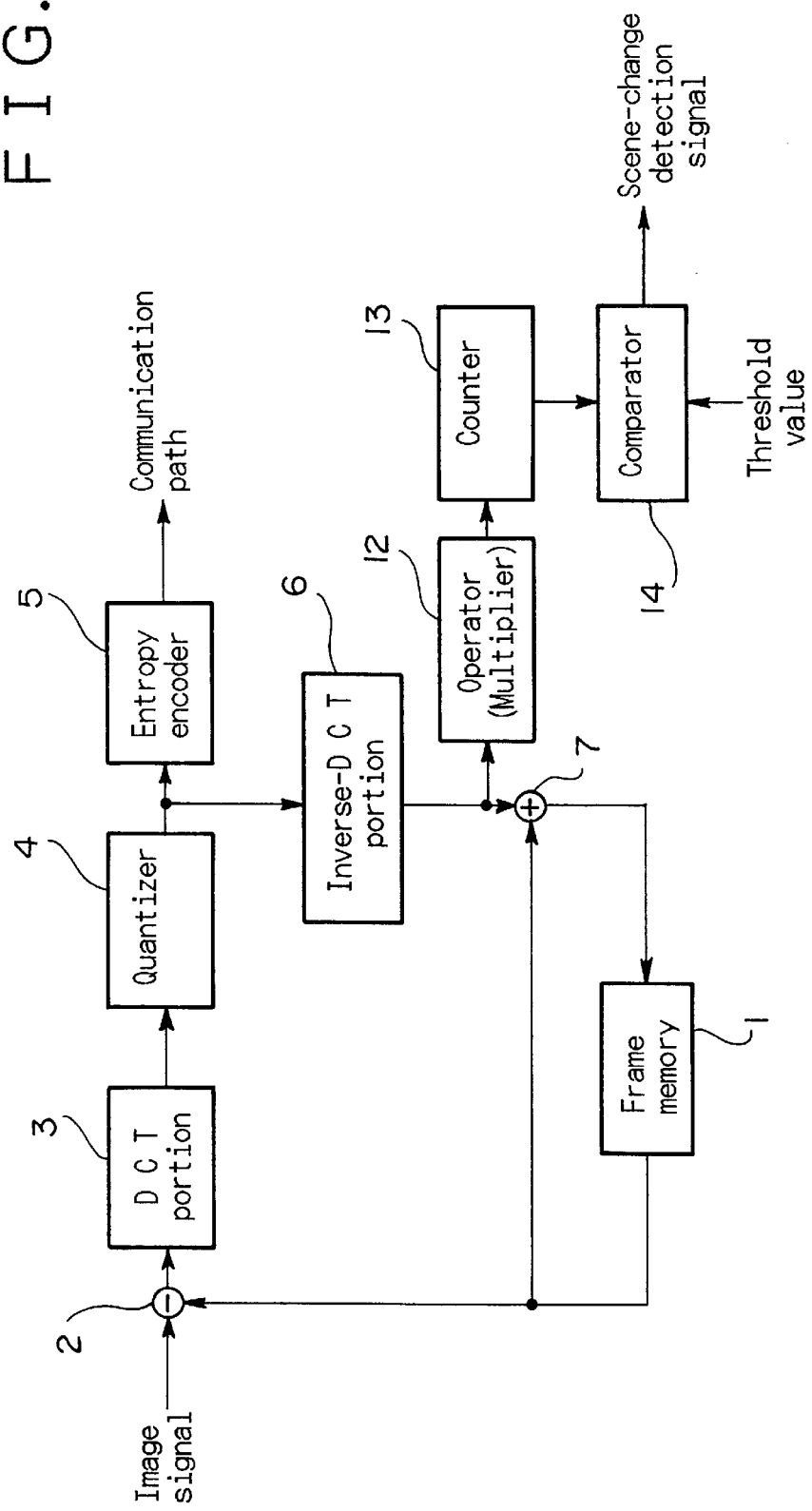
FIG. 1 is a block diagram showing the constitution of embodiment 1 according to the present invention.

The embodiments according to the present invention will be explained in detail referring to the drawings in the following.

Embodiment 1

FIG. 1 is a block diagram showing an embodiment according to the present invention. In the FIGURE, 1 is a frame memory, 2 is a subtracter, 3 is a DCT portion, 4 is a quantizer, 5 is a entropy encoder, 6 is an inverse-DCT portion, and 7 is an adder; these are similar or equivalent portions to conventional portions shown in FIG. 25 having the same symbols, so that detailed explanation will be omitted.

Number 12 is a multiplier, an operator, which performs a specified operation for a prediction error between frames transmitted from the inverse-DCT portion 6, for example, it performs an operation to square the transmitted value, 13 is a counter for summing up the output of the multiplier 12 frame by frame. Number 14 is a comparator which generates a scene-change detection signal showing whether the present frame is a scene-change frame or not based on the comparison result between the counted value in the counter 13 and a threshold value to be compared every time when the encoding of 1 frame is completed.

Next, operation will be explained. The operations ranging from the encoding of an input image signal to the transmission of the signal to a communication path are similar to those in a conventional case, so that the explanation will be omitted. The value x of a prediction error between frames which is output from the inverse-DCT portion 6 in the process of encoding of an image signal is also input to the multiplier 12, and the operation as shown in the equation (3) shown below is executed.

$$y = x^2 \qquad (3)$$

The symbol y in the equation (3) expresses an energy corresponding to the energy of the prediction error signal, and it is sent to the counter 13 to be counted up the total frame by frame. The counted value in the counter 13 is sent to the comparator 14 to be compared frame by frame with a predetermined threshold value. If the comparison result shows that the counted value in the counter 13 is larger than the threshold value, the comparator 14 outputs a scene-change detection signal expressing that the present frame is a scene-change frame.

Embodiment 2

Figure 2:
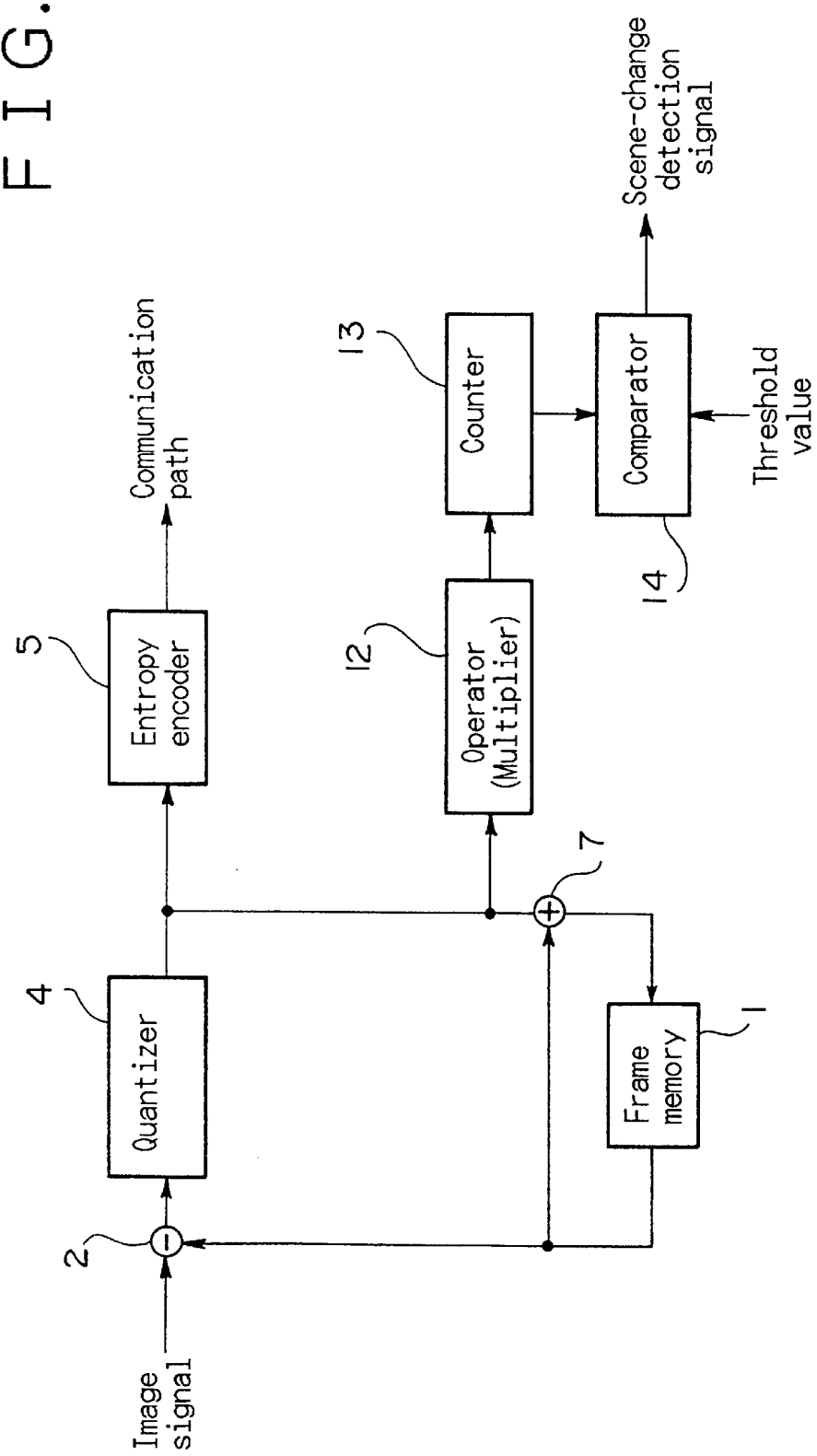
FIG. 2 is a block diagram showing the constitution of embodiment 2 according to the present invention.

FIG. 2 is a block diagram showing the constitution of another embodiment according to the present invention, and the embodiment 2 is a simplified example of the embodiment 1. The complicated processing such as the DCT processing is not included in this embodiment. The subtraction result between the image elements positioned in the corresponding positions of the present frame and the immediately preceding frame stored in the frame memory 1 calculated by the subtracter 2 is directly quantized by the quantizer 4. The quantized result is encoded by the entropy encoder 5 and transmitted to a communication path. In this case also, the operation of a mechanism for detecting a scene-change with the multiplier 12, the counter 13 and the comparator 14 is the same as that in the embodiment 1 shown in FIG. 1.

Embodiment 3

Figure 3:
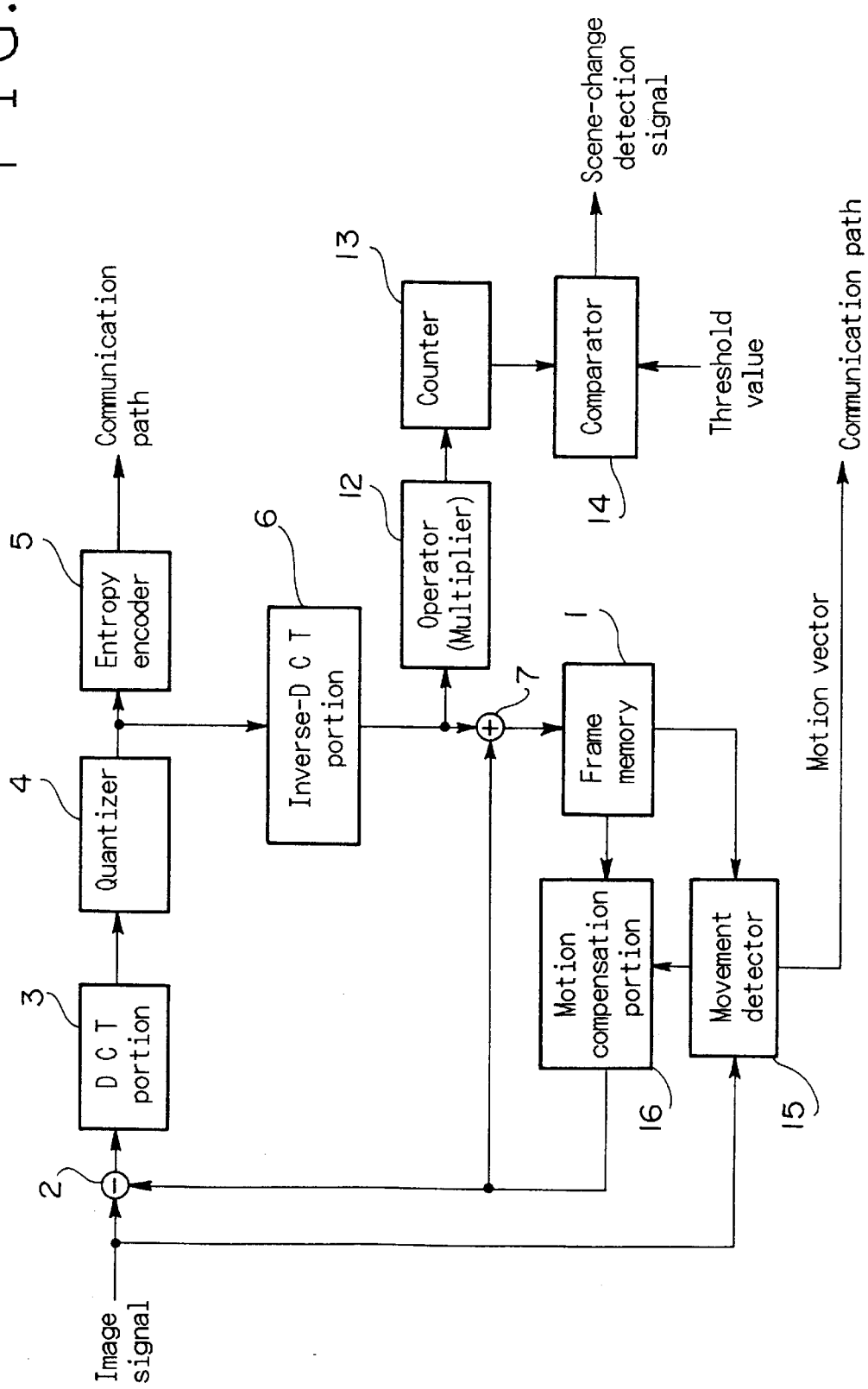
FIG. 3 is a block diagram showing the constitution of embodiment 3 according to the present invention.

FIG. 3 is a block diagram showing the constitution of a further embodiment according to the present invention. In the embodiment 3, in the case of encoding of a moving image, motion compensative prediction is used as a prediction between frames. In the FIGURE, 15 is a movement detector for detecting a motion vector from the input image signal and the image data of the immediately preceding frame stored in the frame memory 1, and 16 is a motion compensator for determining the image elements to be read from frame memory 1 using motion vector detected by the movement detector 15 and producing between-frames prediction signal.

Next, operation will be explained. The motion compensative prediction system does not utilize only a difference between frames obtained by subtraction between the image elements positioned in the corresponding positions in both frames which is used in the embodiment 1 shown in FIG. 1, but in the system the movement of a subject is detected and according to the movement, the image element of which the difference between frames is calculated can be varied. In other words, the movement detector 15 finds what position, in the immediately preceding frame stored in the frame memory 1, an object or a proper size block corresponds to. The result is detected as a motion vector. In the motion compensator 16, an image element in the immediately preceding frame to be used for prediction is decided using the motion vector detected in the movement detector 15. The difference between the image signal of the present frame and that in the immediately preceding frame is calculated by the subtracter 2.

For example, when the frames without any movement continue, the motion vector output from the movement detector 15 is 0, and the difference coincides with the simple difference between frames as in the case of the embodiment 1. As described above, a system using the motion compensative prediction can be considered to be an improved one of the system using a simple difference between frames as described in the embodiment 1 shown in FIG. 1; the operation of the scene-change detection mechanism being composed of the multiplier 12, the counter 13 and the comparator 14 is the same as that in the embodiment 1.

Embodiment 4

In the embodiments 1 and 3 shown in FIG. 1 and FIG. 3, the multiplier 12 is connected to the output of the inverse-DCT portion 6, but it can be connected to the output of the subtracter 2, to the output of the DCT portion 3 or to the output of the quantizer 4, and in every case the same effect as shown in the above can be obtained. In the embodiments 1 and 3, the case where the difference between frames is DCT-processed is shown, but a proper processing is not limited to the DCT processing.

Embodiment 5

In the embodiments shown in FIG. 1 to FIG. 3, the case where the equation (3) is calculated using the multiplier 12 as an operator is shown, but the operation can be performed following an equation as shown below which is more general than the equation (3).

$$y=|x|r \text{(r:real number)} \quad (4)$$

As explained in the above embodiments, it is clear that the detection mechanism for detecting a scene change is quite independent of the algorithm for encoding of a moving image utilizing the correlation between frames.

Embodiment 6

Figure 4:
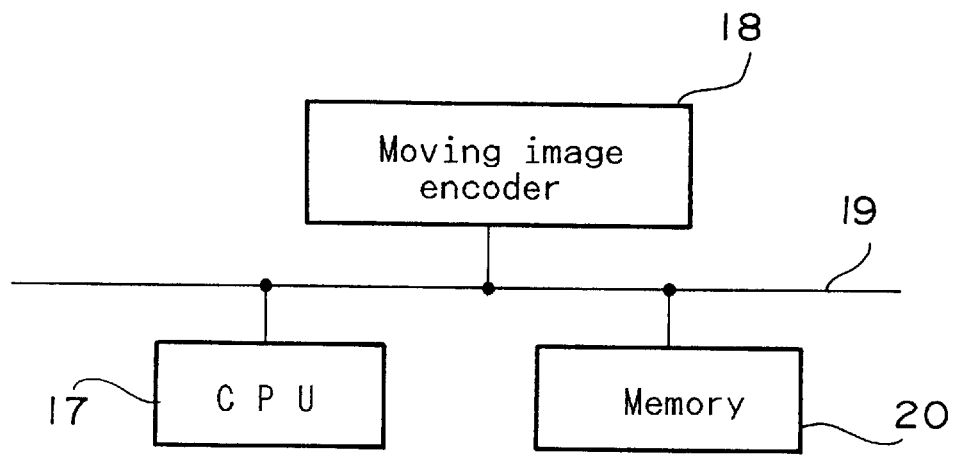
FIG. 4 is a block diagram showing the constitution of embodiments 6, 11 and 16.

In each embodiment described in the above, as a detection mechanism for detecting a scene change, hardware units such as the multiplier 12 as an operator, the counter 13 and the comparator 14, are used; however, the function can be realized with software processing using a CPU 17 of general use as shown in the block diagram shown in FIG. 4. In other words, a moving image encoder 18 composed of the frame memory 1, the subtracter 2, quantizer 4, entropy encoder 5, adder 7, etc. is connected to a bus 19 of the CPU 17, and the prediction error between frames which is necessary for the scene-change detection can be read from the CPU 17. The CPU 17 realizes an operator, a counter and a comparator, that is, a scene-change detection mechanism, following a program stored in a memory 20.

Embodiment 7

Figure 5:
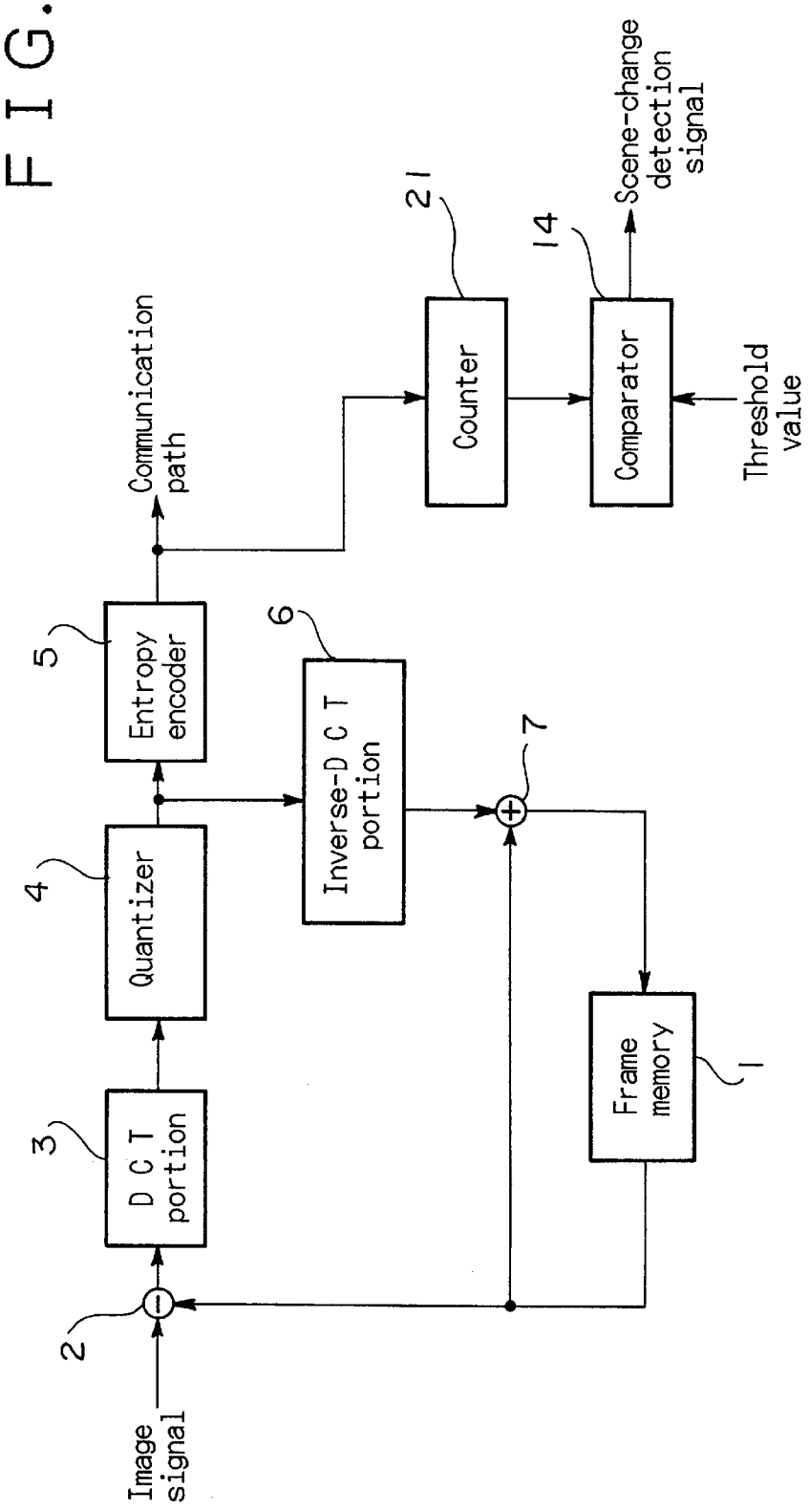
FIG. 5 is a block diagram showing the constitution of embodiment 7 according to the present invention.

FIG. 5 is a block diagram showing the constitution of an embodiment according to the present invention. The same symbols are given to the portions corresponding to those in FIG. 1 and the explanation is omitted. In FIG. 5, 21 is a counter which is connected to the output of the entropy encoder 5 and counts the data quantity of the encoded data frame by frame being output to the communication path from the encoder of the moving image and outputs the counted value to the comparator 14.

In the embodiment 7 too, the comparator 14 compares the data quantity per frame of the encoded data output to the communication path from the entropy encoder 5 with a predetermined threshold value, and if the counted value by the counter 21 is larger than the threshold value, the comparator 14 outputs a scene-change detection signal which expresses that the present frame is a scene-change frame.

Embodiment 8

Figure 6:
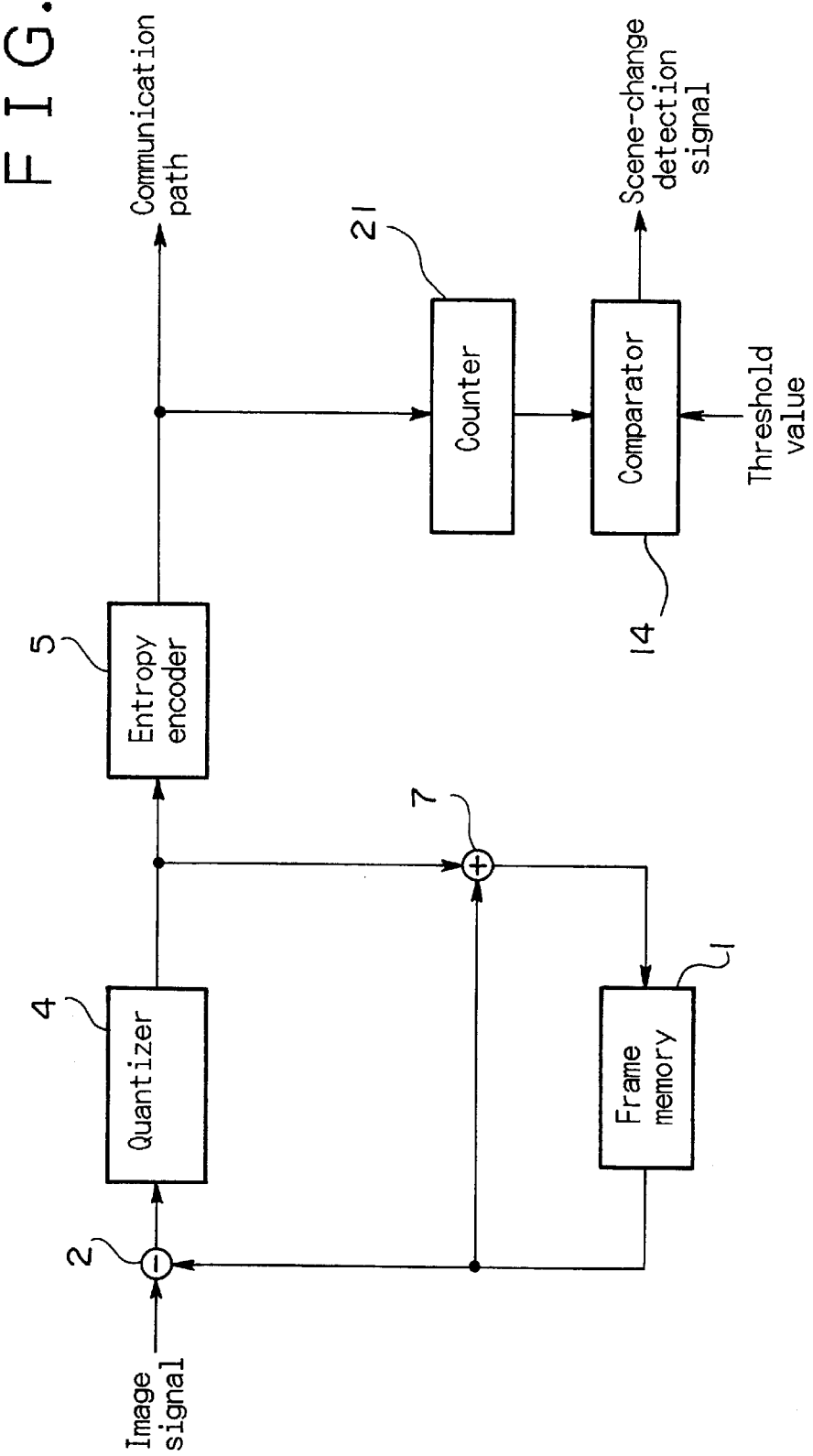
FIG. 6 is a block diagram showing the constitution of embodiment 8 according to the present invention.

FIG. 6 is a block diagram showing the constitution of an embodiment according to the present invention. The encoder portion for a moving image has the same constitution as that shown in FIG. 2. The detection mechanism for detecting a scene change is composed of a counter 21 and a comparator 14 similar to the embodiment 7.

Embodiment 9

Figure 7:
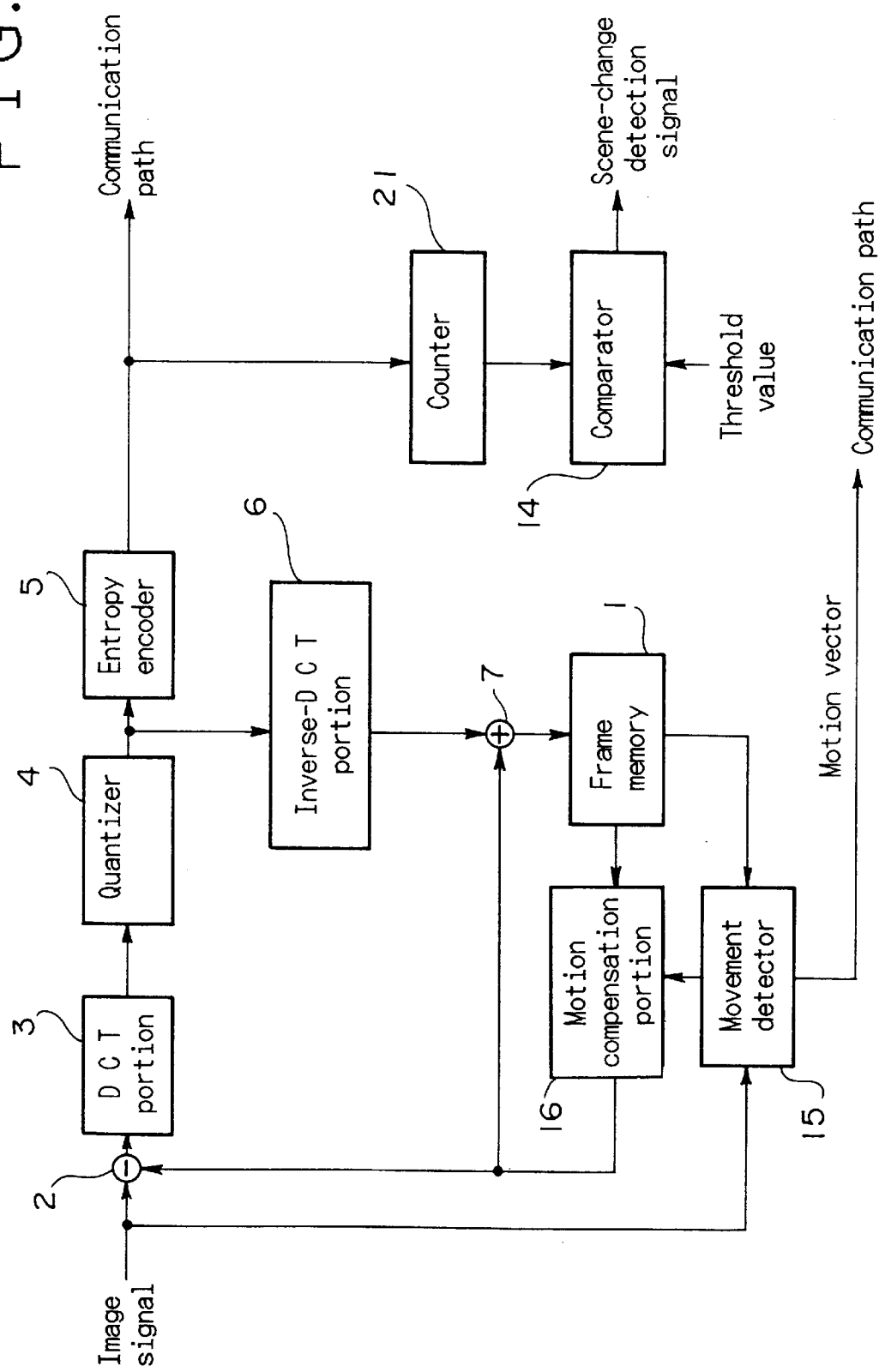
FIG. 7 is a block diagram showing the constitution of embodiment 9 according to the present invention.

FIG. 7 is a block diagram showing the constitution of an embodiment according to the present invention. The encoder portion for a moving image has the same constitution as that shown in FIG. 3. The detection mechanism for detecting a scene change has the same constitution as that in the embodiment 7 shown in FIG. 5.

Embodiment 10

Figure 8:
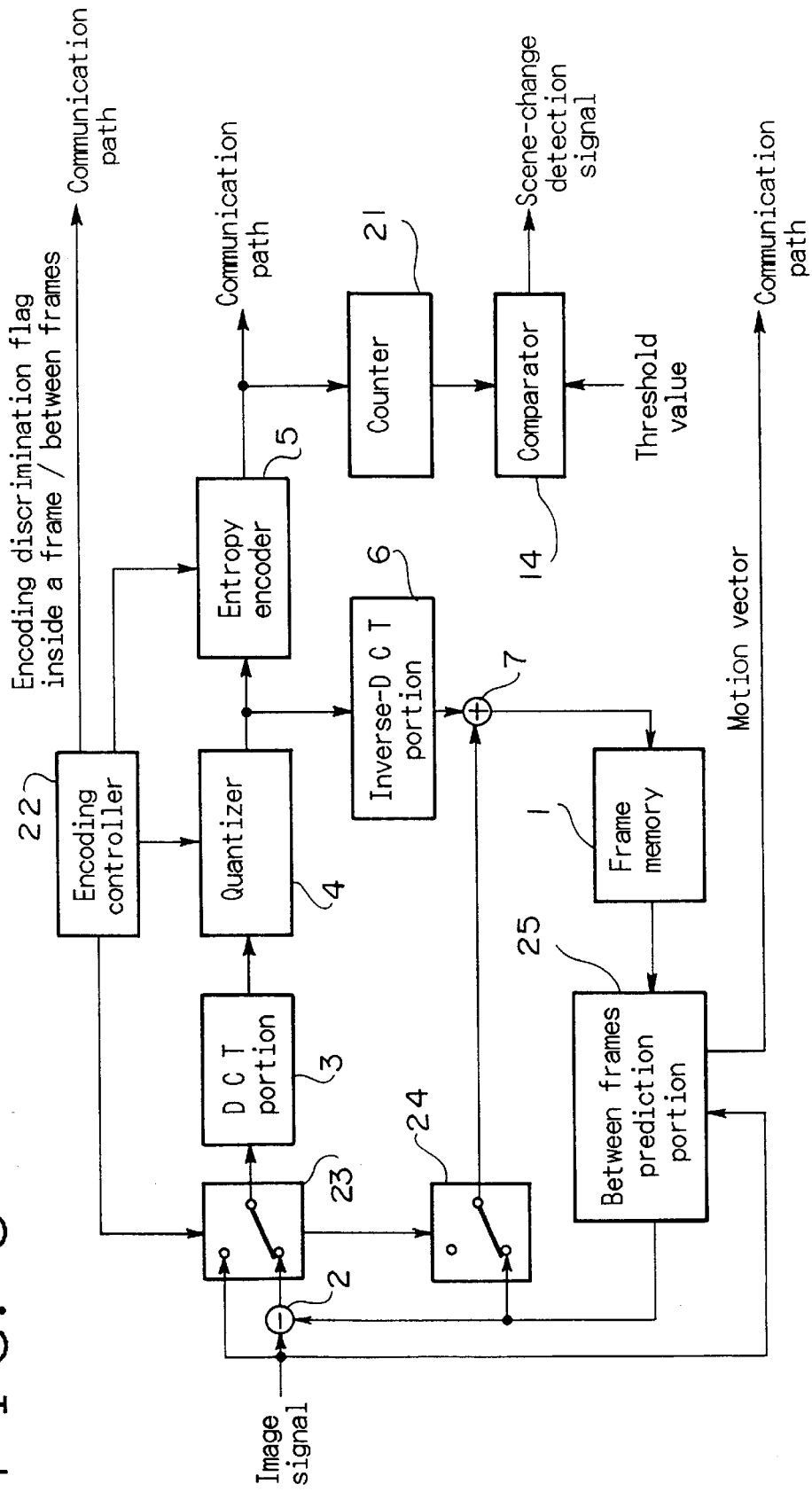
FIG. 8 is a block diagram showing the constitution of embodiment 10 according to the present invention.

FIG. 8 is a block diagram showing the constitution of an embodiment according to the present invention. The embodiment 10 shows the case where the present invention is applied to an encoder for a moving image in which encoding inside a frame and encoding between frames are adatively switched over. In the figure, 22 is an encoding controller which judges which encoding to be used between the encoding inside a frame and the encoding between frames. 23 and 24 are switches for performing changeover between the encoding inside a frame and the encoding between frames the changeover being controlled by the encoding controller 22. Number 25 is a between frames prediction portion for predicting the present frame from an input image signal and the image data of the immediately preceding frame stored in the frame memory 1.

Next, operation will be explained. The encoding controller 22 judges which encoding is to be used, the encoding inside a frame or the encoding between frames, for a block unit of the order of 8×8 image elements, for example, and controls the switches 23 and 24, the characteristics of the quantizer 4 and the code to be used in the entropy encoder 5, and generates a flag showing that which one, encoding inside a frame or encoding between frames, is used for encoding and outputs the flag to the communication path. In the FIGURE, the case is shown where encoding between frames is selected by the switches 23 and 24. When encoding inside a frame is to be selected, the switches 23 and 24 are connected in the opposite directions to those shown in the figure.

A signal which passes the switch 23 is an image signal itself in the case of the encoding inside a frame and is a prediction error signal in the case of the encoding between frames. The signal is given a DCT processing in the DCT portion 3, quantized in the quantizer 4, encoded in the entropy encoder 5 and then transmitted to a communication path. The quantized result in the quantizer 4 is sent to the inverse-DCT portion 6 to be given an inverse-DCT processing, and it is added to the output of the switch 24 in the adder 7, and the result is stored in the frame memory 1. The added result is a decoded image of the present frame, and it is used for the prediction of the next frame. In the case of encoding inside a frame, the output of the switch 24 is 0, and in the case of encoding between frames, the output is a prediction signal between frames.

A between frames prediction portion 25 predicts the present frame from the immediately preceding frame stored in the frame memory 1. In this embodiment, the motion compensative prediction system is used similar to the case shown in FIG. 7, and a movement vector is transmitted to the communication path. In the case of the between frames prediction portion 25, the motion compensative prediction system is not necessarily needed and a simple difference between frames can be used, and in the case of the latter, the transmission of a movement vector is not needed. The detection mechanism for detecting a scene change (the counter 21 and the comparator 14) has the same constitution as that in the embodiment 7 shown in FIG. 5.

Embodiment 11

In the embodiment described in the above, the hardware units, the counter 21 and the comparator 14, are used as a detection mechanism for detecting a scene change, but it is also possible to realize the function with software processing using a CPU for general use as shown in FIG. 4. In the FIGURE, the moving image encoder 18 is connected to the bus 19 of the CPU 17, and it is made possible to read the encoded data quantity, which is necessary for the detection of a scene change, from the CPU 17. The CPU 17 realizes a scene-change detection mechanism, a counter and a comparator, following a program stored in the memory 20.

Embodiment 12

In the embodiments shown in FIG. 5, FIG. 7 and FIG. 8, a case where the output of the subtracter 2 is DCT-transformed is explained, but the processing is not limited to the DCT-transformation and it can be other systems than an orthogonal transformation system such as the DCT-transformation system; it can be, for example, a prediction encoding system.

Embodiment 13

Figure 9:
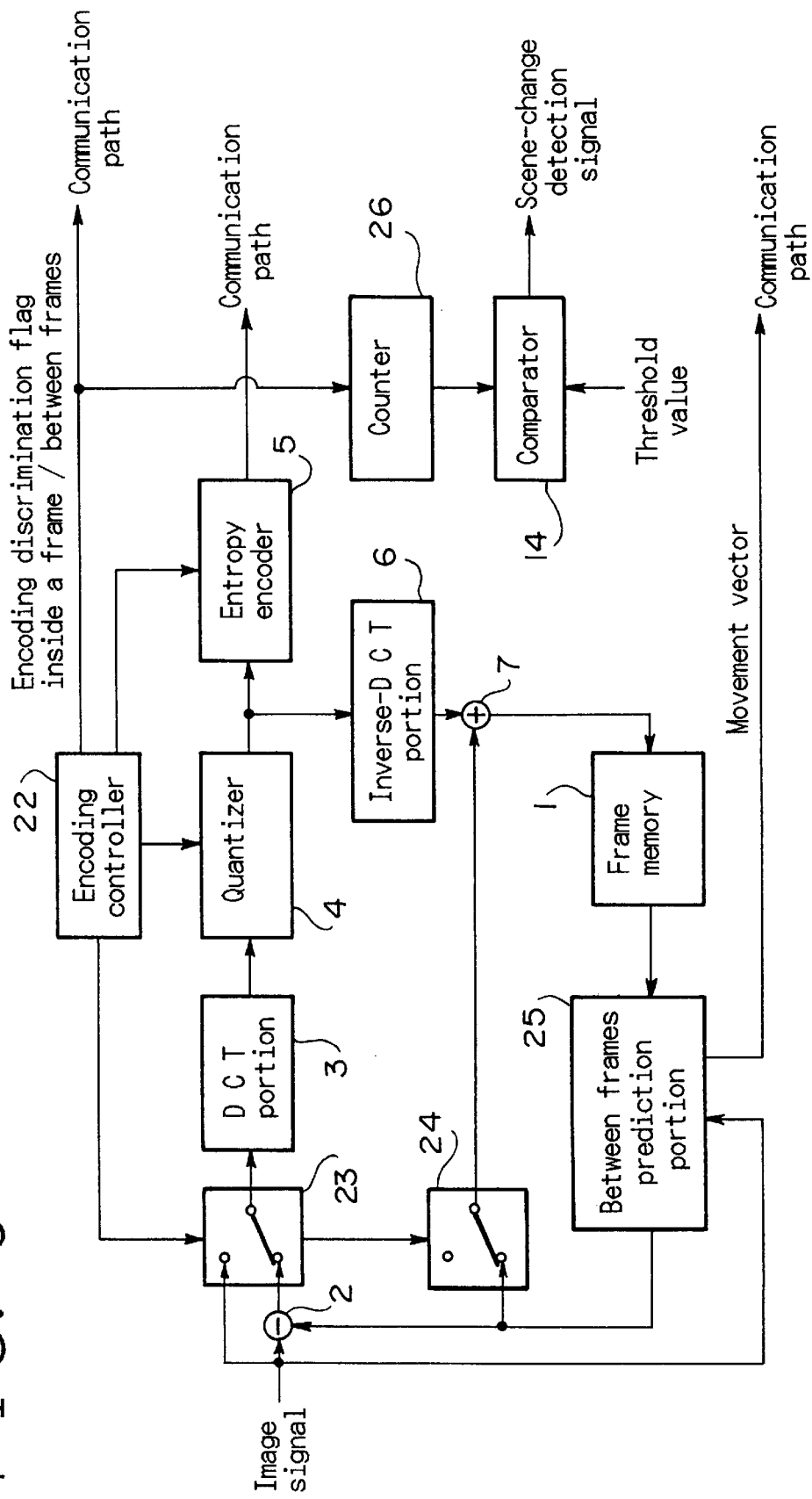
FIG. 9 is a block diagram showing the constitution of embodiment 13 according to the present invention.

FIG. 9 is a block diagram showing an embodiment according to the present invention, and it is the same as that shown in FIG. 8 except a detection mechanism for detecting a scene change; therefore, the detection mechanism for detecting a scene change will be explained. In the FIGURE, 26 is a counter which counts the number of image elements of which the estimation by the correlation between frames is impossible based on a discrimination flag of encoding inside a frame/between frames which is output from the encoding controller 22, and transmits the counted value to the comparator 14.

Next, operation will be explained. At first, the counter 26 counts frame by frame the number of image elements to be encoded inside a frame based on the discrimination flag of encoding inside a frame/between frames. The flag is output from the encoding controller 22. The comparator 14 compares the counted value by the counter 26 with a predetermined threshold value frame by frame. When the counted value is larger than the threshold value it outputs a detection signal of a scene change expressing that the present frame is a scene-change frame.

Embodiment 14

In the embodiment 13, a system is shown in which the combination of motion compensative prediction and DCT is used as an encoder between frames, and DCT is used as an encoder inside a frame, but the present invention is not limited to the system as shown in the above and it can be applied to any system as far as it uses a moving image encoding system in which encoding inside a frame and encoding between frames can be properly switched over.

Embodiment 15

In the abovementioned embodiment, a case where the counter 26 counts the number of image elements encoded by the encoding inside a frame is explained, but another case is possible where the counter 26 counts the number of image elements encoded by the encoding between frames and when the counted value by the counter 26 is smaller than the threshold value, a scene-change signal is output. Further when the judgment which encoding to be used between the encoding inside a frame and encoding between frames is performed by the unit of a certain block (for example, 8×8 image elements), it is also possible that the counter 26 counts the number of the blocks.

Embodiment 16

In the abovementioned embodiment, an example in which the hardware units, the counter 26 and the comparator 14, are used as a detection mechanism for detecting a scene change, but it is also possible to realize the function by software processing using a CPU for general use as shown in FIG. 4. In the figure, the moving image encoder 18 is connected to the bus 19 of the CPU 17, and the number of image elements encoded by the encoding inside a frame which is necessary for detecting a scene change can be read from the CPU 17. The CPU 17 realizes a detection mechanism for detecting a scene change, a counter and a comparator, following a program stored in the memory 20.

Embodiment 17

Figure 10:
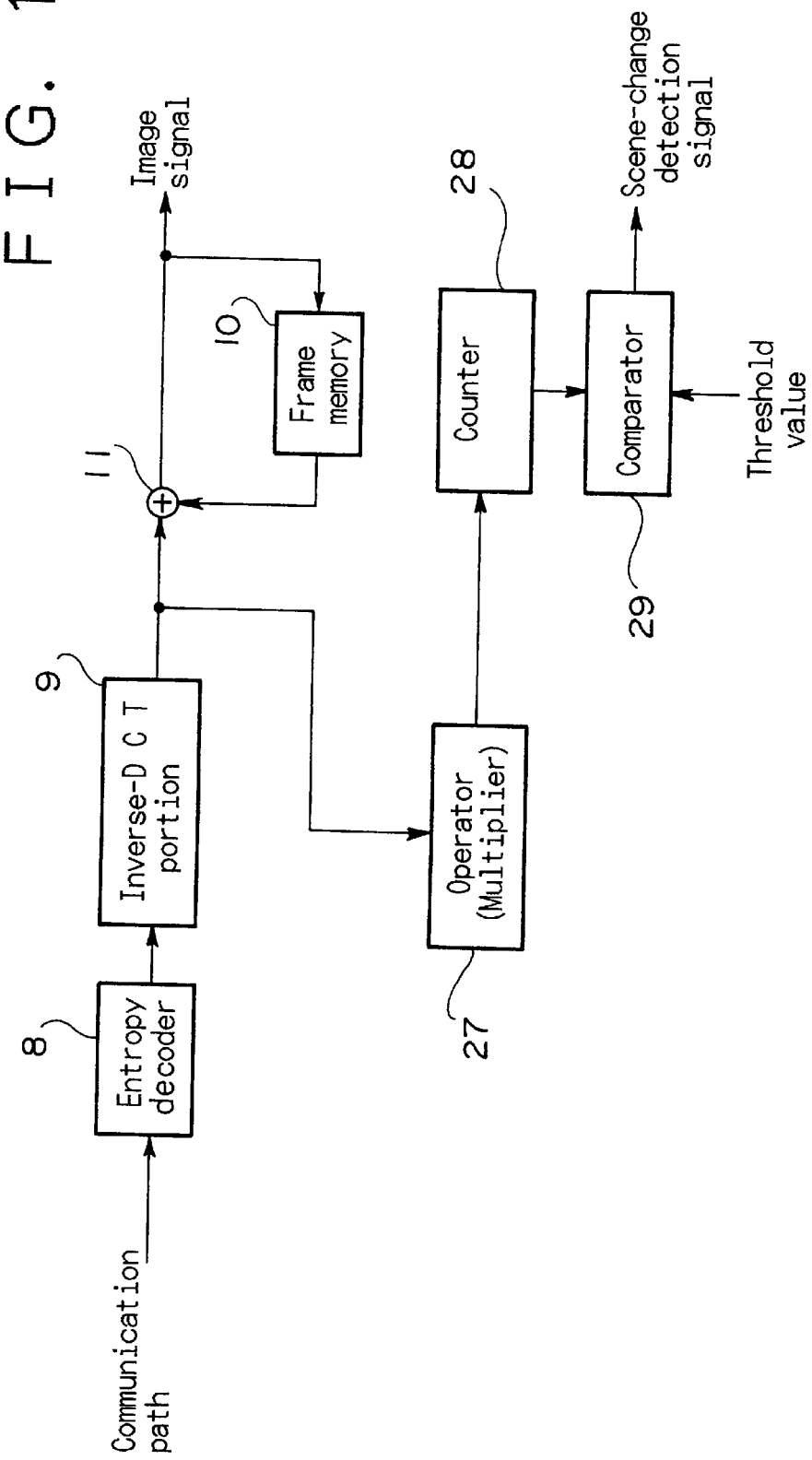
FIG. 10 is a block diagram showing the constitution of embodiment 17 according to the present invention.
Figure 25:
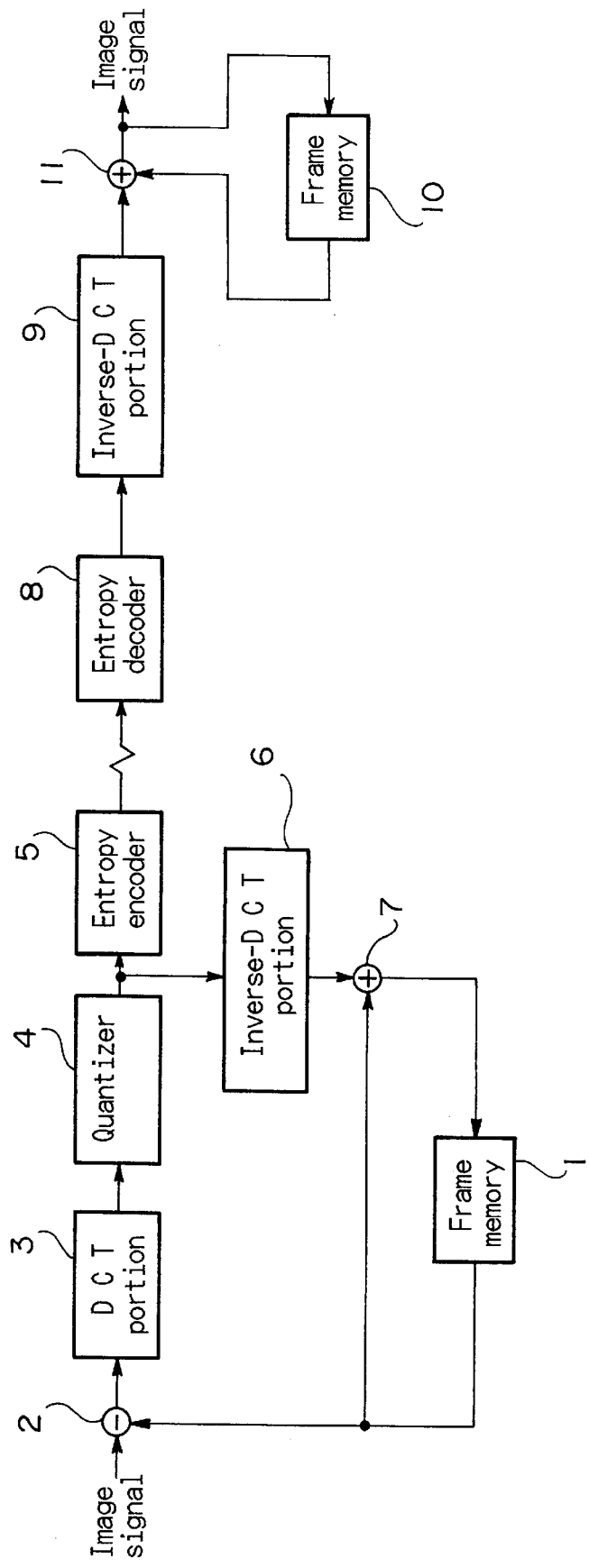
FIG. 25 is a block diagram showing an example of an encoder and that of a decoder to which a conventional scene-change detector is to be applied.

FIG. 10 is a block diagram showing an embodiment according to the present invention. In the figure, 8 is an entropy decoder, 9 is an inverse-DCT portion, 10 is a frame memory, and 11 is an adder; these are the same or corresponding portions to conventional ones, so that identical symbols are given as shown in FIG. 25 and detailed explanation will be omitted.

Number 27 is a multiplier as an operator which performs a specified operation for the prediction error between frames decoded in the inverse-DCT portion 9, for example, an operation to square the prediction error between frames, and 28 is a counter for totaling the output of the multiplier 27 frame by frame. Number 29 is a comparator which compares the counted value by the counter 28 with a threshold value every time when the decoding of 1 frame is completed, and based on the comparison result, it generates a detection signal of a scene change which shows whether the present frame is a scene-change frame or not.

Next, operation will be explained. The process till the encoded data received from a communication path are decoded to an image signal is the same as the process in the conventional case, so that the explanation will be omitted. In the process of decoding to an image signal, a value x of a prediction error between frames output from the inverse-DCT portion 9 is also input to the multiplier 27 and an operation given by the equation shown below is executed.

$$y=x^2 \qquad (5)$$

The value of y in the equation (5) corresponds to the energy of a prediction error signal, and it is sent to the counter 28 to be totaled frame by frame. The counted value of the counter 28 is sent to the comparator 29 and compared with a predetermined threshold value frame by frame. In the result of comparison, when the counted value by the counter 28 is larger than the threshold value, the comparator 29 outputs a detection signal of a scene-change expressing that the present frame is a scene-change frame.

Embodiment 18

Figure 11:
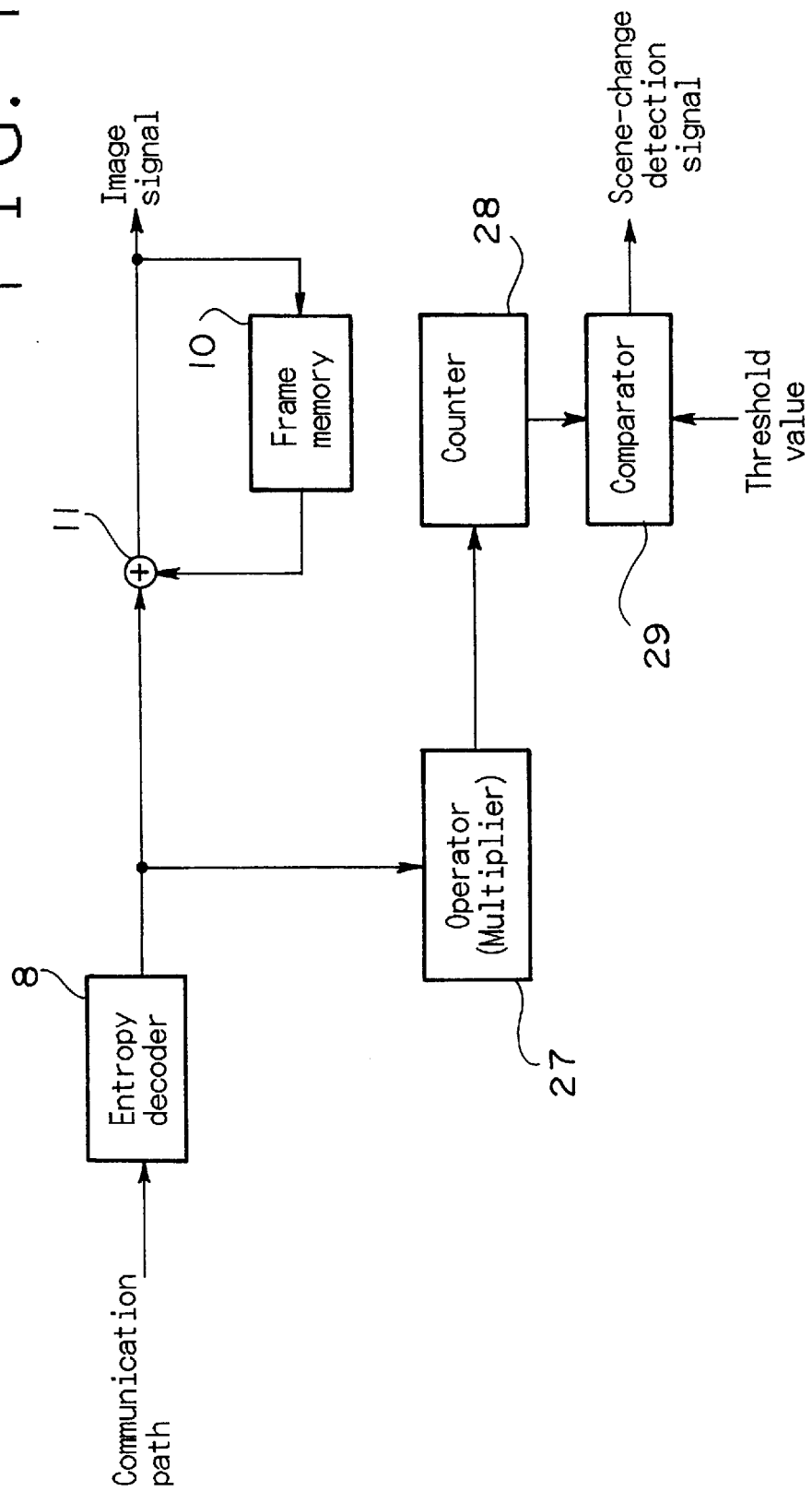
FIG. 11 is a block diagram showing the constitution of embodiment 18 according to the present invention.

FIG. 11 is a block diagram showing the constitution of another embodiment according to the present invention; the embodiment 18 is a simplified example of the embodiment 17 shown in FIG. 10. In other words, the data which are formed by directly entropy encoding the difference between frames are input as encoded data, so that the data, after decoded in the entropydecoder 8, are added in the adder 11 to the image data of the immediately preceding frame stored in the frame memory 10 in such a manner that the image elements positioned in corresponding positions in both frames are added. The added result is output as an image signal of the present frame, and also it is stored in the frame memory 10 to be utilized for the decoding of the next frame. The detection mechanism for detecting a scene change (the adder 27, the counter 28 and the comparator 29) is the same as that in the embodiment 17 shown in FIG. 10.

Embodiment 19

Figure 12:
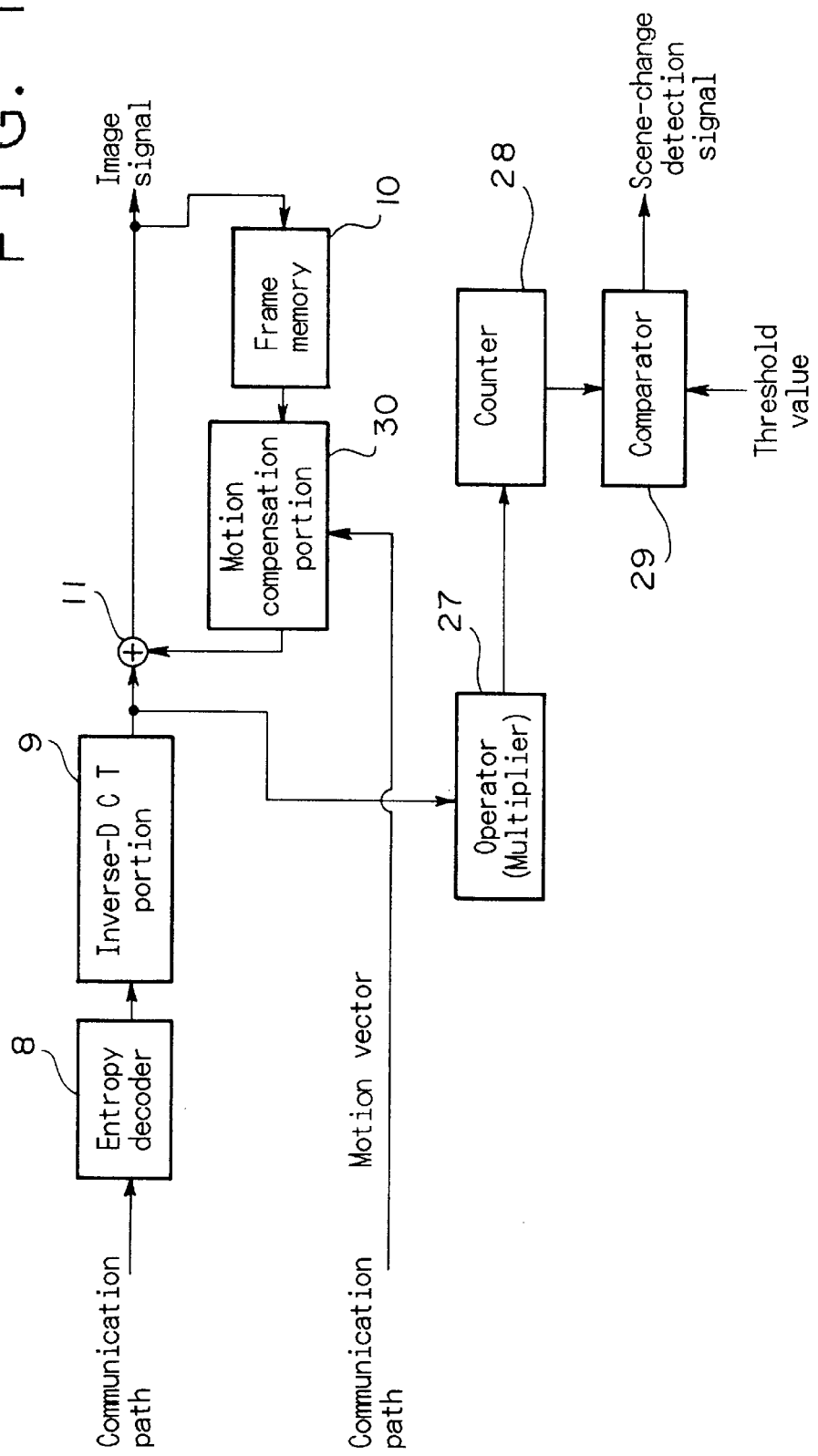
FIG. 12 is a block diagram showing the constitution of embodiment 19 according to the present invention.

FIG. 12 is a block diagram showing a further embodiment according to the present invention. In the embodiment 19, there is shown a case of a moving image decoder which decodes the data being encoded using motion compensative prediction as the prediction between frames in the encoding of a moving image; 30 is a motion compensation portion for performing the motion compensation.

The motion compensative prediction system is not a so simple system in which simple difference between frames is used which is obtained by subtraction between the elements positioned in corresponding positions in both frames, but in the system the movement of a subject is detected and the image elements for calculating the difference between frames can be varied. In other words, it is found that the position of an object or a block having a proper size in the present frame corresponds to what position in the preceding frame, and the difference is detected as a motion vector. The image elements in the preceding frame to be used for prediction are decided using the motion vector and the difference between the present frame and the preceding frame is found. For example, when the frames having no movement continue, the motion vector becomes 0 and the result coincide with that in the case where a simple difference between frames is used. Therefore, in this system a motion vector is needed in addition to the encoded data in the case of decoding.

In this decoder, encoded data are converted to an image signal through the same path as in the case of FIG. 10, that is, through the entropy decoder 8, the inverse-DCT portion 9 and the adder 11. The decoded result of the present frame is stored in the frame memory 10 and utilized for the decoding of the next frame. The motion compensation portion 30 decides the image elements in the preceding frame to be used for prediction using a motion vector transmitted to the communication path from the encoder, and takes out the values of the image elements from the frame memory 10 and apply them to the adder 11. As described above, the system using the motion compensative prediction is considered to be an improved system of a system in which simple difference between frames is used as shown in FIG. 10, but the operation of the detection mechanism for detecting a scene change, that is, the multiplier 27, the counter 28 and the comparator 29, is the same as that shown in FIG. 10.

Embodiment 20

In the embodiments shown in FIG. 10 and FIG. 12, there is shown a case where the multiplier 27 is connected to the output of the inverse-DCT portion 9, but the multiplier 27 can be connected to the input of the inverse-DCT portion 9, and in this case too, a similar effect to that in the above-mentioned embodiment can be obtained. In the embodiments shown in FIG. 10 and FIG. 12, explanation is given about a case where a DCT processing is given to the difference between frames but the processing is not limited to the DCT processing, and moreover a system other than the orthogonal transformation such as the DCT, for example, an estimation encoding system can be used.

Embodiment 21

In the embodiments shown in FIG. 10 to FIG. 12, a case is shown where the equation (5) is calculated by the multiplier 27 as an operator, but the operation can be performed using a more general equation as shown below.

$$y=|x|r \text{(r: real number)} \qquad (6)$$

From the explanation of the embodiments described above, it will be clearly understood that the detection mechanism for detecting a scene change is quite independent of the algorithm of a moving image encoder utilizing the correlation between frames.

Embodiment 22

Figure 13:
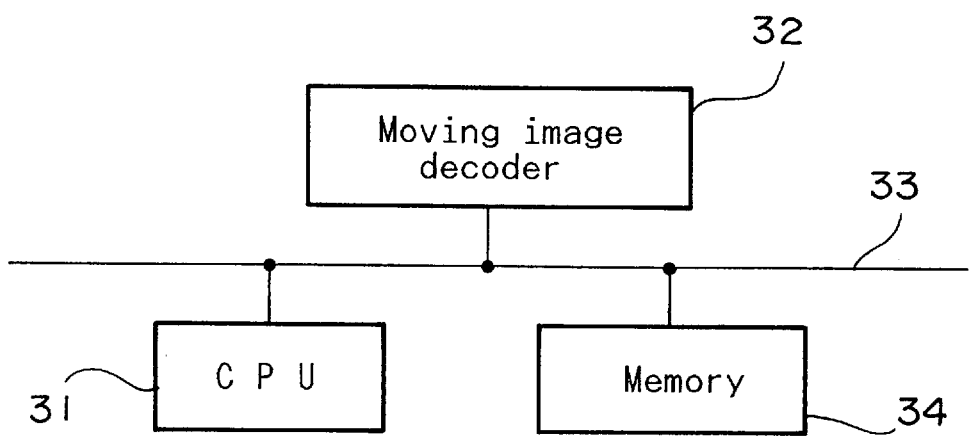
FIG. 13 is a block diagram showing the constitution of embodiments 22, 27 and 32 according to the present invention.

In the abovementioned embodiments, the hardware units such as the multiplier 27 as an operator, the counter 28 and the comparator 29 are used as a detection mechanism for detecting a scene change, but it is also possible to realize the function with software processing using a CPU 31 for general use as expressed in the block diagram shown in FIG. 13. In this embodiment, a moving image decoder 32 being composed of an entropy decoder 8, an inverse-DCT portion 9, a frame memory 10, an adder 11, etc. is connected to a bus 33 of a CPU 31, and the prediction error between frames which is necessary for detecting a scene change can be read from the CPU 31. The CPU 31 realizes the function of an operation portion, a counter and a comparator, that is, the function of the detection mechanism for detecting a scene change.

Embodiment 23

FIG. 14 is a block diagram showing the constitution of an embodiment according to the present invention. The same symbols as those in FIG. 10 are given to the corresponding portions, and the explanation of them is omitted. In the FIGURE, 35 is a counter which is connected to the input of the entropy decoder 8 and counts the data quantity of the encoded data to be input to the moving image decoder frame by frame, and the counted value is output to the comparator 29.

Next, operation will be explained. The counter 35 connected to the input of the entropy decoder 8 counts frame by frame the data quantity of the encoded data input from the communication path and the counted value is transmitted to the comparator 29. In the comparator 29, a predetermined threshold value is compared with the value counted by the counter 35 frame by frame, and when the counted value by the counter 35 is larger than the threshold value, a detection signal of a scene change is output.

Embodiment 24

Figure 15:
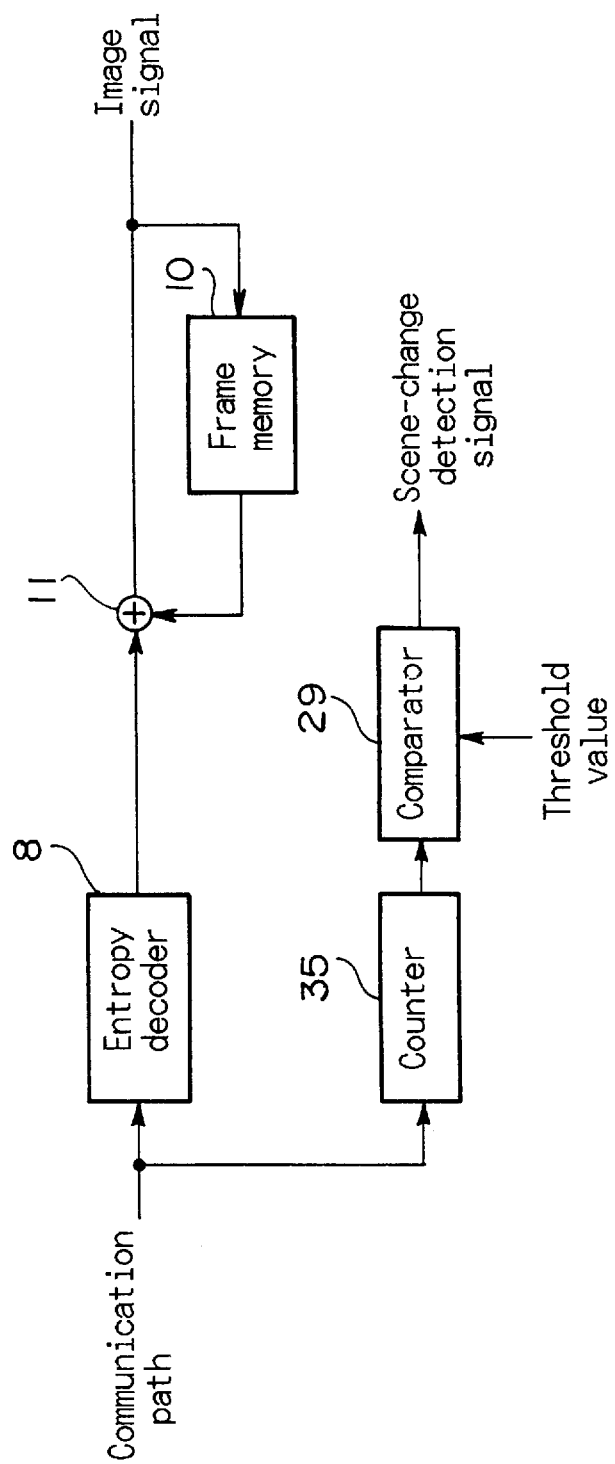
FIG. 15 is a block diagram showing the constitution of embodiment 24 according to the present invention.

FIG. 15 is a block diagram showing the constitution of another embodiment according to the present invention. This embodiment corresponds to the embodiment shown in FIG. 11, and the moving image decoder has the same constitution as that shown in FIG. 11. The detection mechanism for detecting a scene change is composed of the counter 35 and the comparator 29, and has the same constitution as that in the embodiment shown in FIG. 14.

Embodiment 25

Figure 16:
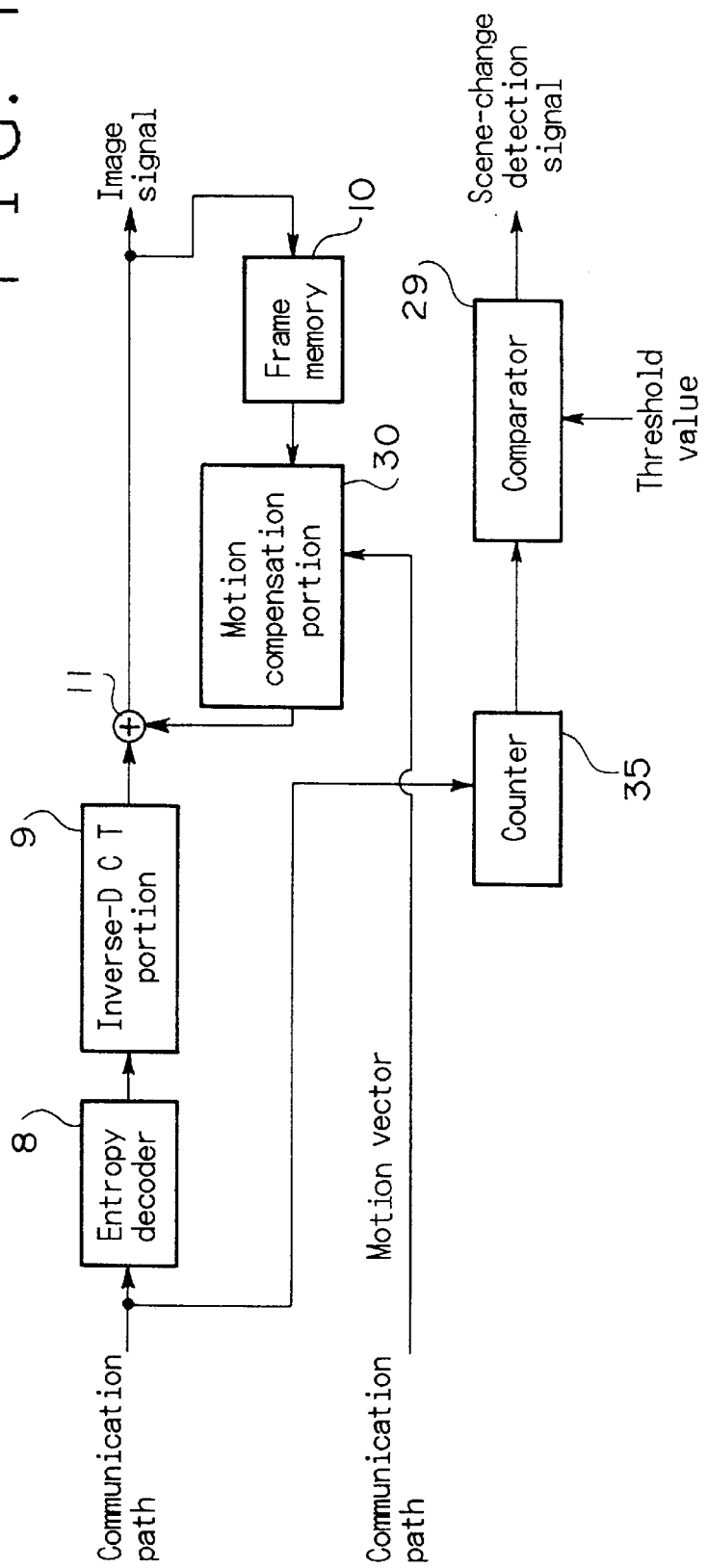
FIG. 16 is a block diagram showing the constitution of embodiment 25 according to the present invention.

FIG. 16 is a block diagram showing the constitution of a further embodiment according to the present invention. The embodiment 25 corresponds to the embodiment shown in FIG. 12, and the moving image decoder has the same constitution as that shown in FIG. 12. The detection mechanism for detecting a scene change being composed of the counter 35 and the comparator 29 has the same constitution as that shown in FIG. 14.

Embodiment 26

Figure 17:
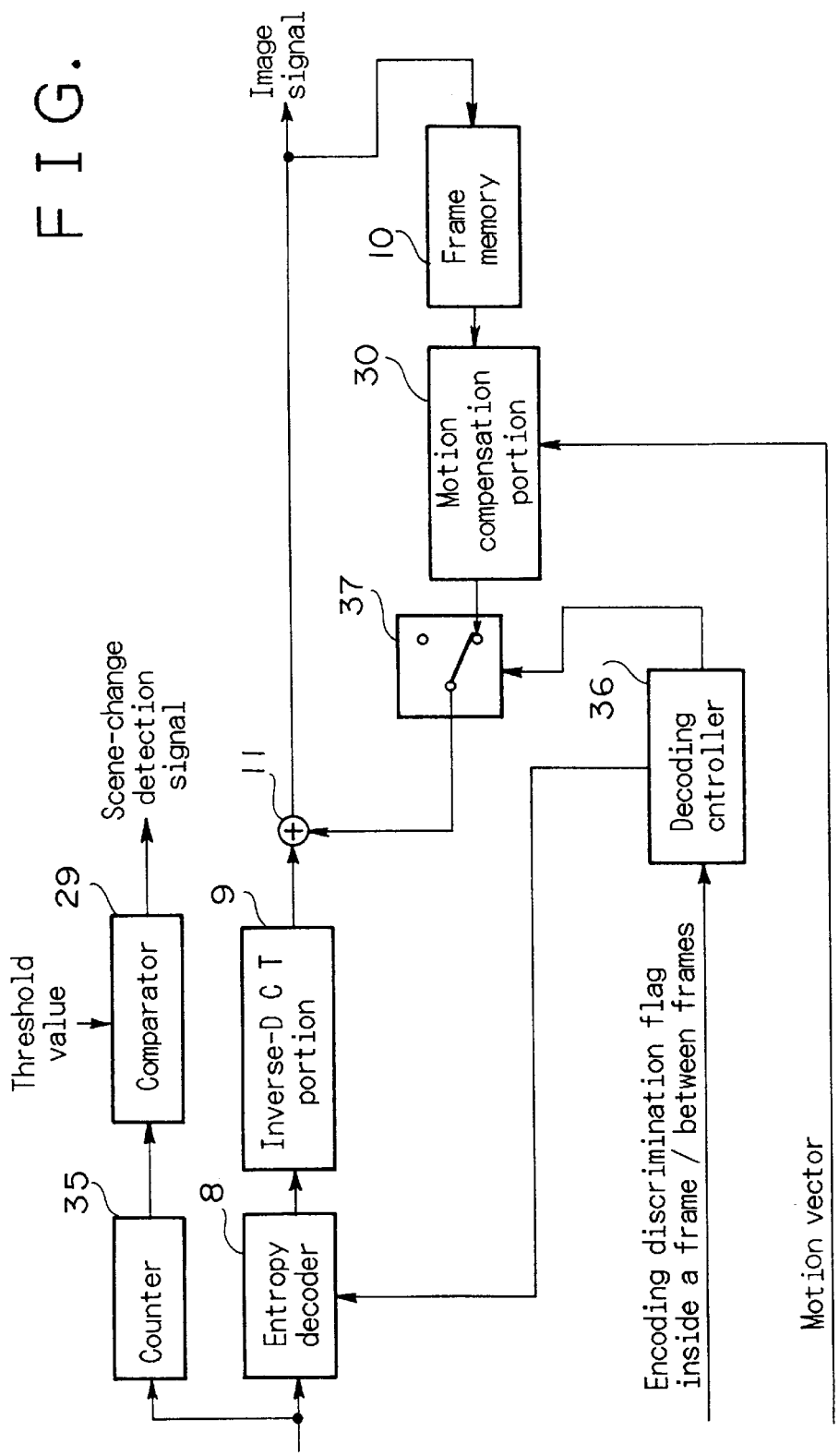
FIG. 17 is a block diagram showing the constitution of embodiment 26 according to the present invention.

FIG. 17 is a block diagram showing the constitution of a yet another embodiment according to the present invention. The embodiment 26 is an example in which the invention is applied to a moving image decoder for decoding the data encoded by a moving image encoder having a switching mechanism for properly switching over the encoding inside a frame and the encoding between frames. In the FIGURE, 36 is a decoding controller for judging that the input encoded data are encoded by the encoding inside a frame or by the encoding between frames based on the encoding flag inside a frame/between frames which is transmitted from the communication path, and 37 is a switch whose switching is controlled by the decoding controller 36.

Next, operation will be explained. The decoding controller 36 judges that either method of encoding, inside a frame or between frames, is used for a block unit of the order of 8×8 image elements, for example, and controls the codes to be used in the switch 37 and in the entropy decoder 8. The FIGURE shows a state where the switch 37 is set on a side where the data encoded by the encoding between frames are to be decoded, and when the data encoded by the encoding inside a frame are to be decoded, the switch 37 is opened.

The encoded data received from the communication path is decoded by the entropy decoder 8, and after that the data are sent to the inverse-DCT portion 9 for the execution of an inverse-DCT processing and added to the output of the switch 37 by the adder 11. The addition result is the image signal itself obtained in decoding the present frame, and it is output to the exterior and also stored in the frame memory 10 to be utilized for the decoding of the next frame. It is assumed in this embodiment that the data encoded using the movement correction estimation system as an encoding system between frames are to be decoded, and the operation is the same as that in the embodiment shown in FIG. 12; however, the estimation between frames is not limited to the motion compensative prediction. The detection mechanism for detecting a scene change (the counter 37 and the comparator 29) has the same constitution as that in the embodiment shown in FIG. 14.

Embodiment 27

In the above embodiment, the case is shown where the hardware units, the counter 35 and the comparator 29, are used as the detection mechanism for detecting a scene change; however, it is also possible to realize the function with software processing using a CPU for general use as shown in FIG. 13. In the FIGURE, the moving image decoder 32 is connected to the bus 33 of the CPU 31, and the encoded data quantity of every frame which are necessary for the detection of a scene change can be read from the CPU 31. The CPU 31 realizes the function of the counter and the comparator, that is, a detection mechanism for detecting a scene change, following a program stored in the memory 34.

Embodiment 28

In the embodiments shown in FIG. 14, FIG. 16 and FIG. 17, it is estimated to execute a DCT processing for the difference between frames on the moving image encoding side, but the processing is not limited to the DCT processing, and it can be other one than orthogonal transformation such as DCT, and it can be a prediction encoding method, for example.

Embodiment 29

Figure 18:
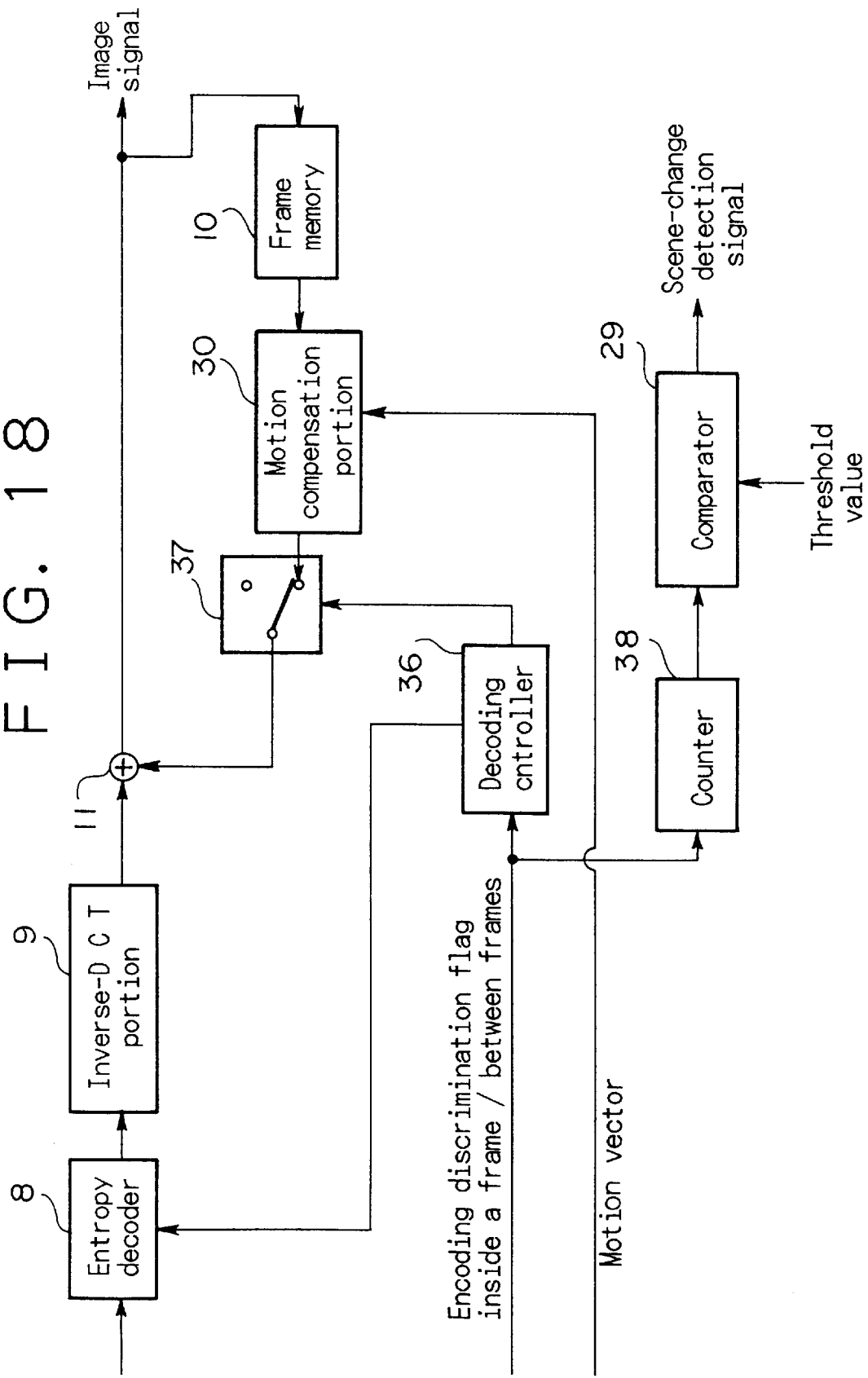
FIG. 18 is a block diagram showing the constitution of embodiment 29 according to the present invention.

FIG. 18 is a block diagram showing an embodiment according to the present invention, and it has the same constitution as that shown in FIG. 17 except a detection mechanism for detecting a scene change; therefore, only the detection mechanism for detecting a scene change will be explained. In the figure, 38 is a counter which counts the number of image elements of which the prediction by the correlation between frames is impossible based on a discrimination flag for the encoding inside a frame/between frames which is input to the encoding controller 36, and transmits the counted value to the comparator 29.

Next, operation will be explained. The counter 38 counts the number of image elements encoded frame by frame using the encoding inside a frame based on a discrimination flag for the encoding inside a frame/between frames. In the comparator 29, a predetermined threshold value is compared with the counted value by the counter 38 frame by frame, and when the counted value is larger than the threshold value, the counter outputs a scene-change detection signal.

Embodiment 30

In the embodiment 29, a case is explained where the decoding is performed on the data encoded using the combination of motion compensative prediction and DCT as the encoding between frames, and using DCT as the encoding inside a frame, but a system is not limited to the one described in the above; as far as data are encoded by a moving image encoding system in which the encoding method can be properly switched between the encoding inside a frame and the encoding between the frames, the detection mechanism can be applied to any system.

Embodiment 31

In the embodiment 29, explanation is given about the case where the counter 38 counts the number of image elements which are encoded by the encoding inside a frame, but a case is also possible where the counter 38 counts the number of image elements which are encoded by the encoding between frames, and when the counted value is smaller than the threshold value, a scene-change detection signal is output; moreover when the judgment of which encoding to be used between the encoding inside a frame and the encoding between frames is performed by the block unit of a certain size (for example, 8×8 image elements), the number of blocks can be counted by the counter 38.

Embodiment 32

In the embodiment 29, the case where the hardware units, the counter 38 and the comparator 29, are used as a detection mechanism for detecting a scene change is shown, but the function can be realized with software processing using a CPU for general use as shown in FIG. 13. In the FIGURE, the moving image decoder 32 is connected to the bus 33 of the CPU 31, and the number of image elements encoded by the encoding inside a frame which is necessary for the detection of a scene change can be read from the CPU 31. The CPU 31 realizes the function of the counter and the comparator, a scene-change detection mechanism, following a program stored in the memory 34.

Embodiment 33

In the embodiments 1 to 32, a case is shown where the value counted by the counter is compared with a threshold value in the comparator, and when the value counted by the counter is larger than the threshold value, the present frame is judged to be a scene-change frame; however, the detection of a scene-change frame can be performed more accurately by making the processing in the comparator be more complicated. For example, it is assumed that a scene is being photographed with a camera, and the shooting direction of the camera is moved from the left to the right, then in this case, since the image changes every frame, the counted value by the counter becomes large over the consecutive frames; therefore there is a possibility that all frames are judged to be scene-change frames when a simple comparison is made with a threshold value. Actually however, it is desirable that the first frame in which the counted value by the counter goes over the threshold value is judged to be a scene-change frame. It is easy to cope with such a requirement by adding a process to judge that when counted values exceed over consecutive frames, only the first frame is a scene-change frame. A countermeasure is also possible by varying the threshold value of the comparator corresponding to the calculation results of the counter.

Embodiment 34

Figure 19:
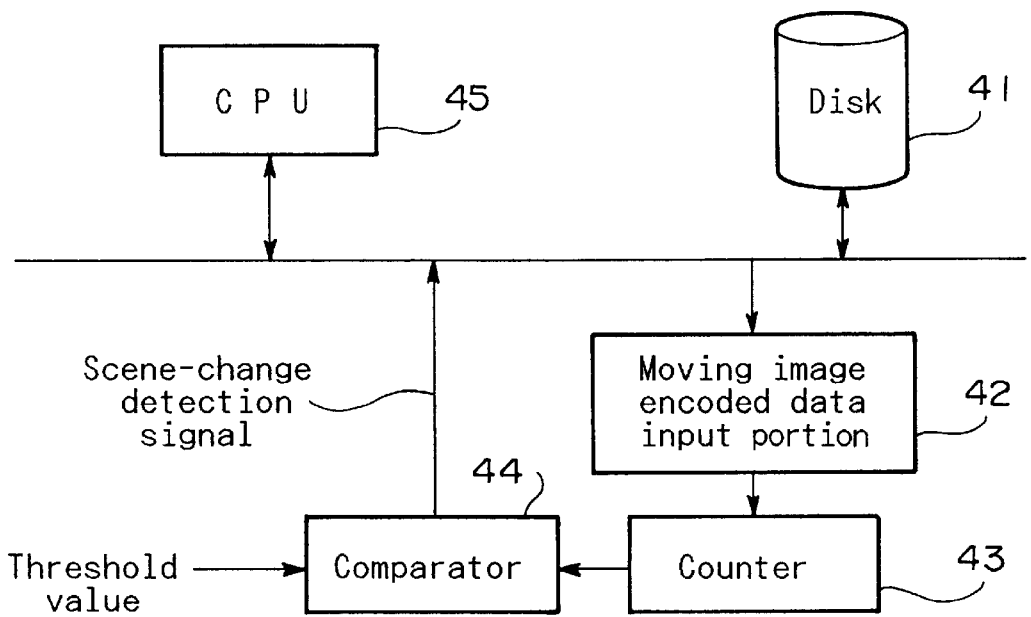
FIG. 19 is a block diagram showing the constitution of embodiment 34 according to the present invention.

FIG. 19 is a block diagram showing the constitution of an embodiment according to the present invention. In the FIGURE, 41 is a disk in which encoded data of a moving image composed of a plurality of scenes are stored, and 42 is an encoded data input portion of a moving image which takes-in encoded data of a moving image from the disk 41. Number 43 is a counter which counts the data quantity of encoded data of a moving image frame by frame which are taken-in by the input portion of the moving image encoded data 42, and 44 is a comparator which compares the counted value by the counter with a threshold value, and based on the comparison result it generates a signal expressing that the frame is a scene-change frame or not. Number 45 is a CPU which controls the whole of the system.

Next, operation will be explained. In the disk 41, the encoded data of an image signal of a moving image being composed of a plurality of scenes are stored, and the encoded data input portion of a moving image 42 reads-out encoded data of a moving image in order from the disk 41. The read-out encoded data of a moving image are transmitted to the counter 43 and the data quantity is counted frame by frame, and the counted result is output to the comparator 44. In the comparator 44, the received counted value is compared with a threshold value, and when the counted value is larger than the threshold value, a scene-change detection signal expressing that the frame is a scene-change frame is output. It is so constituted that the scene-change detection signal which is output from the comparator 44 can be read from the CPU 45.

Embodiment 35

Figure 20:
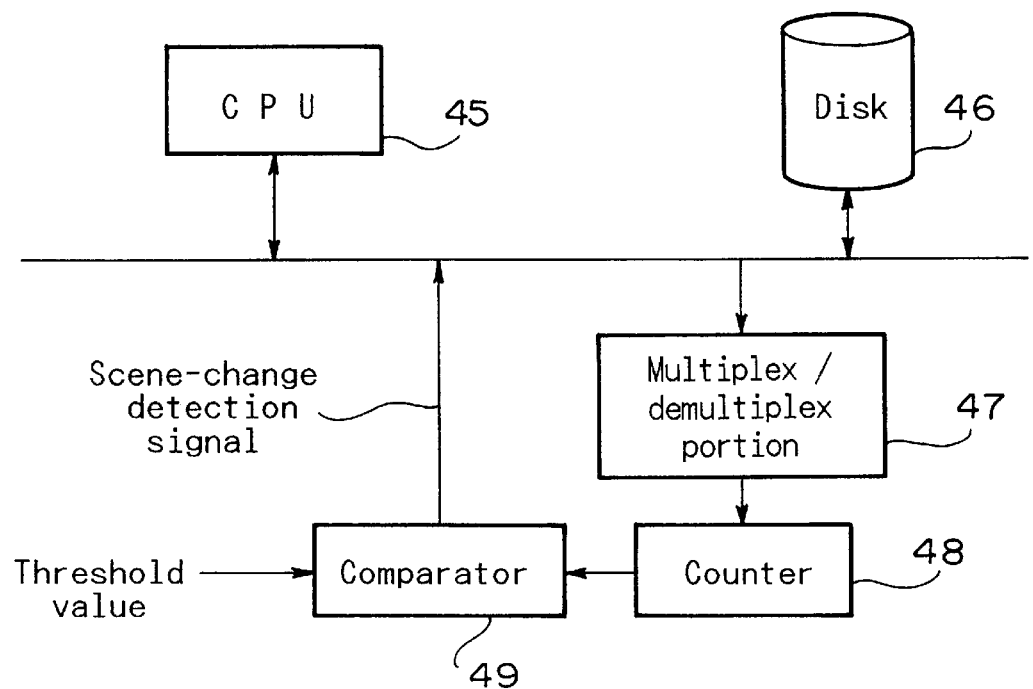
FIG. 20 is a block diagram showing the constitution of embodiment 35 according to the present invention.

FIG. 20 is a block diagram showing an embodiment according to the present invention. In the FIGURE, 46 is a disk in which the encoded data of a moving image which are encoded by properly switching the encoding between frames and the encoding inside a frame are stored, and the switching is performed in such a way that when an image signal of a moving image being composed of a plurality of scenes is to be encoded utilizing the correlation between frames, the image elements which are judged to be impossible to predict by the correlation between frames are switched to be encoded utilizing the correlation inside a frame. Number 47 is a multiple separator for extracting an encoding mode showing either method, the encoding between frames or the encoding inside a frame, is applied to the encoding of image elements from the encoded data taken-in from the disk 46, and 48 is a counter which counts the encoding mode extracted by the multiplexer/demultiplexer 47 frame by frame and counts the number of image elements of which the between frames prediction is judged to be possible or impossible. Number 49 is a comparator in which the value counted in the counter 48 frame by frame is compared with a threshold value, and generates a signal expressing that the frame is a scene-change frame or not based on the comparison result.

Next, operation will be explained. The multiplexer/demultiplexer 47 reads-out the encoded data of a moving image in order being stored in the disk 41, and extracts an encoding mode expressing which mode, the between frames encoding mode or the inside a frame encoding mode, is used for encoding image elements. The extracted encoding mode is sent to the counter 48, and the counter 48 counts the encoding mode frame by frame, and counts the number of image elements of which the between frames prediction is judged to be impossible. The counted result is sent to the comparator 49 and compared with a threshold value, and when the counted value is larger than the threshold value, the comparator 49 outputs a scene-change detection signal expressing that the frame is a scene-change frame. The scene-change detection signal output from the comparator 49 is arranged to be read from the CPU 45.

The functions of the encoded data input portion of a moving image 42, multiplexer/demultiplexer 47 the counters 43 and 48, and the comparators 44 and 49 in the embodiments 34 and 35 can be realized using hardware units of exclusive use or software using a CPU for general use.

Embodiment 36

Figure 21:
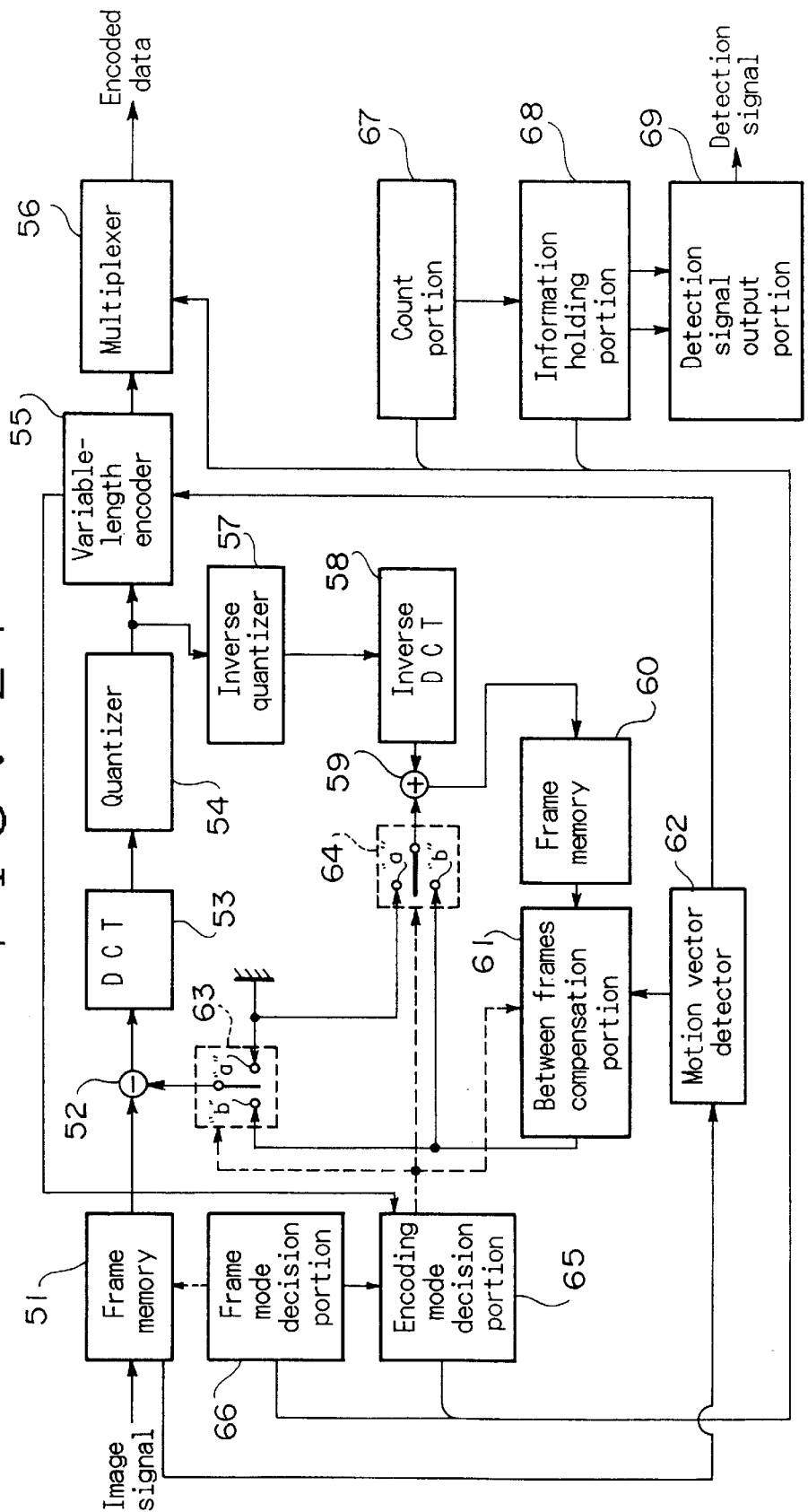
FIG. 21 is a block diagram showing the constitution of embodiment 36 according to the present invention.

FIG. 21 is a block diagram showing an embodiment according to the present invention. In the FIGURE, 51 is a frame memory having a capacity of storing an image signal of a plurality of frames, 52 is a subtracter which finds the difference between the image signal read-out from the frame memory 51 and an prediction signal between frames, and 53 is a transducer for performing discrete cosine transformation (hereinafter referred to as DCT), a kind of orthogonal transformation, of the difference output. Number 54 is a quantizer for quantizing a DCT-processed signal, 55 is a variable-length encoder which performs variable-length encoding of a quantized signal, and 56 is a multiplexer for multiplexing a variable-length encoded signal with other data showing encoding mode, frame mode, etc. Number 57 is an inverse quantizer for inverse-quantizing a signal output from the quantizer 54, 58 is an inverse transducer for inverse-DCT processing the inverse-quantized signal, 59 is an adder for adding an estimation signal between frames to a signal output from the inverse transducer 58, and 60 is a frame memory for storing an image signal output from the adder 59. Number 61 is a prediction portion between frames which generates a prediction signal between frames in reading-out the data to be used for the prediction between frames from the frame memory 60, 62 is a moving vector detector which detects a moving vector which is necessary for the prediction between frames and gives the data to the prediction portion between frames 61, 63 is a switch for switching-over a prediction signal between frames and the earth and gives the output to the subtracter 52, and 64 is also a switch for switching-over a prediction signal between frames and the earth and gives the output to the adder 59.

Number 65 is an encoding mode decision portion for deciding an encoding mode for each split area formed by splitting a frame of a moving image into a plurality of areas in selecting an encoding mode out of a first encoding mode which performs encoding using the information of the present frame, a second encoding mode for performing encoding using the information of a frame which was already encoded and positioned in the past on the time axis, a third encoding mode for performing encoding using the information of a frame which was already encoded and positioned in the future on the time base, and a fourth encoding mode for performing encoding using the information of a frame which was already encoded and positioned in the past on the time axis and the information of a frame which was already encoded and positioned in the future on the time axis. Number 66 is a frame mode decision portion for deciding the frame mode of a moving image in selecting a frame mode out of the following cases: a first frame to be encoded using only the above-mentioned first encoding mode, a second frame to be encoded using either of the first encoding mode or the second encoding mode, and a third frame to be encoded using any encoding mode among the first to the fourth encoding mode. Number 67 is a counter which counts the occurrence frequency of each encoding mode in a frame from the output of the encoding mode decision portion 65, and 68 is an information holding portion which holds the information of the output of the frame mode decision portion 66 and the counted result by the counter 67 for the quantity of at least 2 consecutive frames. Number 69 is a detection signal outputting portion which compares the frame modes of 2 consecutive frames being held in the information holding portion 68 with each other, and compares the occurrence frequency of the encoding modes of 2 consecutive frames being held in the information holding portion 68 with each other, and when the comparison results are in accordance with a predetermined condition, it outputs a detection signal.

Figure 22:
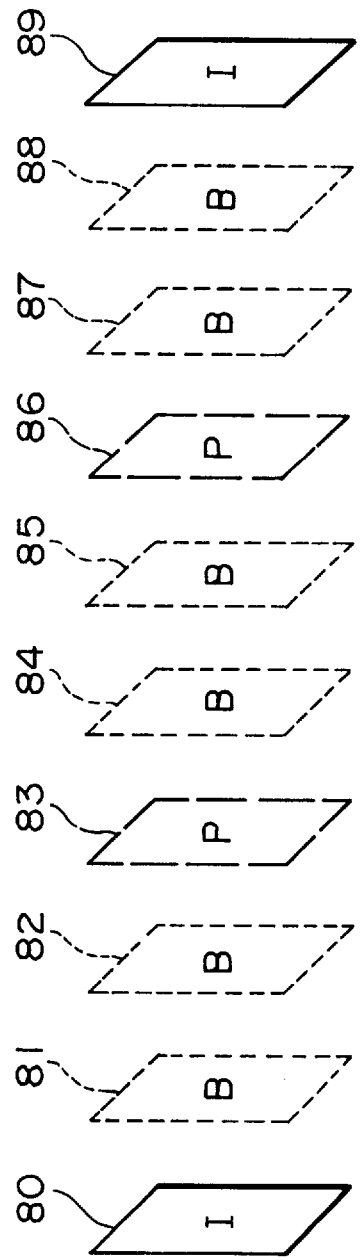
FIG. 22 is an illustrative representation for explaining the algorithm for the encoding of a moving image of MPEG system.

Next, operation will be explained. It is expected that MPEG (Motion Picture Image Coding Experts Group) system, a moving image encoding system for accumulation media, of which, at present, standardization is being discussed in ISO, will be used for the moving image encoder portion in the embodiment 36. The concept of the MPEG will be explained using FIG. 22 in the following. In FIG. 22, frame modes are expressed with I, P and B, and I frame corresponds to the first frame in this embodiment, P frame corresponds to the second frame, and B frame corresponds to the third frame. In encoding at first, I frame 80 is independently encoded, and next, P frame 83 is prediction-encoded using the I frame 80. After that, B frames 81 and 82 are prediction-encoded in this order using I frame 80 and P frame 83. Then, I or P frame (in FIG. 22, P frame 86) which is in a nearest place on the time axis is encoded, and then B frames are encoded (in FIG. 22, B frames 84 and 85) going back to the past on the time axis; the operation described in the above is repeated. As described in the above, in the encoding by the MPEG system, buffers for a plurality of frames are needed. For example, to complete the encoding of B frames 81 and 82, I frame 80 and P frame 83 are needed, and in conclusion, frames 80 to 83 must be stored.

Next, the operation of the embodiment 36 will be explained going back to FIG. 21 for reference. An image signal from the exterior is stored in the memory 51. In this case, as described in the above, a plurality of frames are stored in the frame memory 51. The contents of frames are read-out from the frame memory 51 in the order as explained in the MPEG algorithm epitome shown in FIG. 22, and in the subtracter 52, the difference between the output of the switch 63, a prediction signal between frames, and the content of a frame stored in the memory is found. Next, the output of the subtracter 52 is DCT-processed, a kind of orthogonal transformation, in the transducer 53, and the transformation coefficient is quantized in the quantizer 54 corresponding to the bit allocation allotted to each coefficient. The quantized transformation coefficients are subjected to further data compression in the variable length encoder 55 in allotting a shorter code for a pattern having a higher probability of occurrence according to the statistical character, and the data are mixed with the other data, for example, those data showing frame mode, encoding mode, etc., and then they are output as encoded data.

The output of the quantizer 54 is given the operations being opposite to those of quantizer 54 and transducer 53 by an inverse quantizer 57 and an inverse transducer 58, and the data are utilized for generating the prediction signal between frames. In this case, a signal obtained from the output of the inverse transducer becomes an input signal of the transducer 53 added with a quantizing error. The output of the inverse transducer 58 is added to the output signal of the switch 64 in the adder 59, and stored in the frame memory 60. In this case, the output signal of the switch 64 is the same as that of the switch 63; therefore, the output of the adder 59 becomes a signal read-out from the frame memory 51 added with a quantizing error.

Next, the prediction between frames 61 is subjected to the control of the frame mode decision portion 66 which decides the frame mode out of the frame modes, the first frame to the third frame, and to the control of the encoding decision means 65 which decides the encoding mode to be used out of the encoding modes, the first to the fourth encoding modes, and receives a movement vector given by the movement vector detector 62; thereby, it reads-out the data to be used for the prediction between frames from the frame memory 60, and generates an estimation signal between frames to give the signal to the switches 63 and 64. An encoding decision portion 65 decides the most efficient encoding mode in receiving the encoding data quantity from the variable length encoder 55. The switches 63 and 64 are controlled by an encoding mode decision portion 65 and a frame mode decision portion 66, and when the frame mode is the first frame, contact points on "a" side of the switches 63 and 64 are made ON, and an earthing signal is output to the subtracter 52 or to the adder 59 through the switch 63 or 64. When the frame mode is the second frame or the third frame, and further if the encoding mode is the first encoding mode, the contact points on "a" side of the switches 63 and 64 are made ON, and the earthing signal is output to the subtracter 52 or adder 59, and if the encoding mode is other than the first encoding mode the contact points on "b" side of the switches 63 and 64 are made ON and the output of the between frames prediction portion 61 is given to the subtracter 52 and the adder 59 through the switch 63 and 64.

Next, a detection mechanism for detecting a scene-change of a moving image in this embodiment will be explained. A count means 67, in receiving the output of the encoding mode decision means 65, counts the number of times of use of each of the first, the second, the third or the fourth encoding mode in a frame being encoded presently. An information holding portion 68 memorizes the frame mode, the output of the frame mode decision portion 66, in other words, it memorizes that the frame being encoded presently is the first frame, the second frame or the third frame; it also memorizes the counted result by the count portion 67. Further, the information holding portion holds the information about the frame mode and the counted result of the encoding mode for at least 2 consecutive frames on the time axis. A detection signal output means 69 takes-out the frame mode and the counted result of the encoding mode of the 2 consecutive frames on the time axis, that is, a subject frame and a frame which is positioned in the past by 1 frame from the subject frame (hereinafter referred to as the preceding frame), and performs the following processes.

At first, concerning the subject frame, put the number of times of use of the first encoding mode as N1, the number of times of use of the second encoding mode as N2, the number of times of use of the third encoding mode as N3 and the number of times of use of the fourth encoding mode as N4; in the similar way, concerning the preceding frame, put the number of times of use of the first encoding mode as n1, the number of times of use of the second encoding mode as n2, the number of times of use of the third encoding mode as n3 and the number of times of use of the fourth encoding mode as n4. In this case, the detection signal output portion 69, according to the kind of the subject frame and the preceding frame, investigates whether the following conditions are satisfied or not, and when the conditions are satisfied, it outputs a detection signal expressing that the subject frame is a scene-change frame.

Condition 1: when the subject frame is the first frame and the preceding frame is the first or the second frame, the detection signal is not output. In the MPEG system, as seen from FIG. 22, this condition can be considered almost not to occur.

Condition 2: when the subject frame is the first frame and the preceding frame is third frame, and when the following equation holds good for a threshold value z decided beforehand, a detection signal expressing that the subject frame is a scene-change frame is output. The condition shows that the probability of predicting the preceding frame using the information of the subject frame is small.

$$n2/(n1+n2+n3+n4) > z \tag{7}$$

The above-mentioned equation is an example expressing the condition, and if it shows that the probability of predicting the preceding frame using the information of the subject frame is small, it is possible to use other conditional equations as shown below than the equation shown in the above.

$$n2/(n3+n4) > z \quad (8)$$

$$(n1+n2)/(n1+n2+n3+n4) > z \quad (9)$$

Condition 3: when the subject frame is the second frame and the preceding frame is the first or the second frame, and if the following equation holds good for a predetermined threshold value y, a detection signal expressing that the subject frame is a scene-change frame is output. In the MPEG system, as seen from FIG. 22 this condition can be considered almost not to occur. This condition shows that the probability of predicting the subject frame using the information of the preceding frame is small.

$$N1/(N1+N2) > y \quad (10)$$

This inequation (10) is also an example which expresses the condition, and if it shows that the probability of predicting the subject frame using the information of the preceding frame is small, it is also possible to use other conditional equation as shown below than the above inequation.

$$N1/N2 > y \quad (11)$$

Condition 4: when the subject frame is the second frame and the preceding frame is the third frame, and if the following inequation holds good for a predetermined threshold value x, a detection signal expressing that the subject frame is a scene-change frame is output. This condition shows that the probability of predicting the preceding frame using the information of the subject frame is small.

$$n2/(n1+n2+n3+n4) > x \quad (12)$$

This inequation is also an example which expresses the condition, and if it shows that the probability of estimating the preceding frame using the information of the subject frame is small, it is also possible to use conditional inequations (13), (14) other than the above-mentioned equation.

$$n2/(n3+n4) > x \quad (13)$$

$$(n1+n2)/(n1+n2+n3+n4) > x \quad (14)$$

Condition 5: when the subject frame is the third frame and the preceding frame is the first or the second frame, and if the following inequation holds good for a predetermined threshold value w, a detection signal expressing that the subject frame is a scene-change frame is output. This condition shows that the probability of predicting the subject frame using the information of the preceding frame is small.

$$N3/(N1+N2+N3+N4) > w \quad (15)$$

The inequation (16) is also an example expressing the condition, and if it shows that the probability of predicting the subject frame using the information of the preceding frame is small, it is also possible to use other conditional inequations as shown below than the equation shown in the above.

$$N3/(N2+N4) > w \quad (16)$$

$$(N1+N3)/(N1+N2+N3+N4) > w \quad (17)$$

Condition 6: when the subject frame is the third frame and the preceding frame is the third frame, and if the following inequation holds good for a predetermined threshold value v, a detection signal expressing that the subject frame is a scene-change frame is output. This condition shows that the probability of predicting the subject frame using the information of the frame positioned in the future on the time axis and of predicting the preceding frame using the information of the frame positioned in the past on the time axis is large.

$$(n2/(n1+n2+n3+n4)) \times (N3/(N1+N2+N3+N4)) > v \quad (18)$$

The inequation (18) is also an example which shows the condition, and if the probability of predicting the subject frame using the information of a frame positioned in the future on the time axis, and of predicting the preceding frame using the information of a frame positioned in the past on the time axis is large, it is also possible to use other conditional inequations as shown below than the inequation described in the above.

$$((n1+n2)/(n1+n2+n3+n4)) \times ((N1+N3)/(N1+N2+N3+N4)) > v \quad (19)$$

$$(n2/(n3+n4))(N3/(N2+N4)) > v \quad (20)$$

It is not necessary to use all the conditions described in the abode, and selection of them is possible. For example, it is possible not to use the condition 1 and the condition 3 which almost do not occur in the MPEG system.

When the frames which satisfy the above-mentioned conditions continue, it is possible to consider that the scene-changes every frame or to regard the scenes as a unit of scenes. For the latter, it is possible to cope with such a situation by adding a function to the detection signal output portion, the function which outputs a detection signal only for a first frame of the frames which satisfy the above conditions and for a first frame of the frames which cease to satisfy the above conditions.

Embodiment 37

Figure 23:
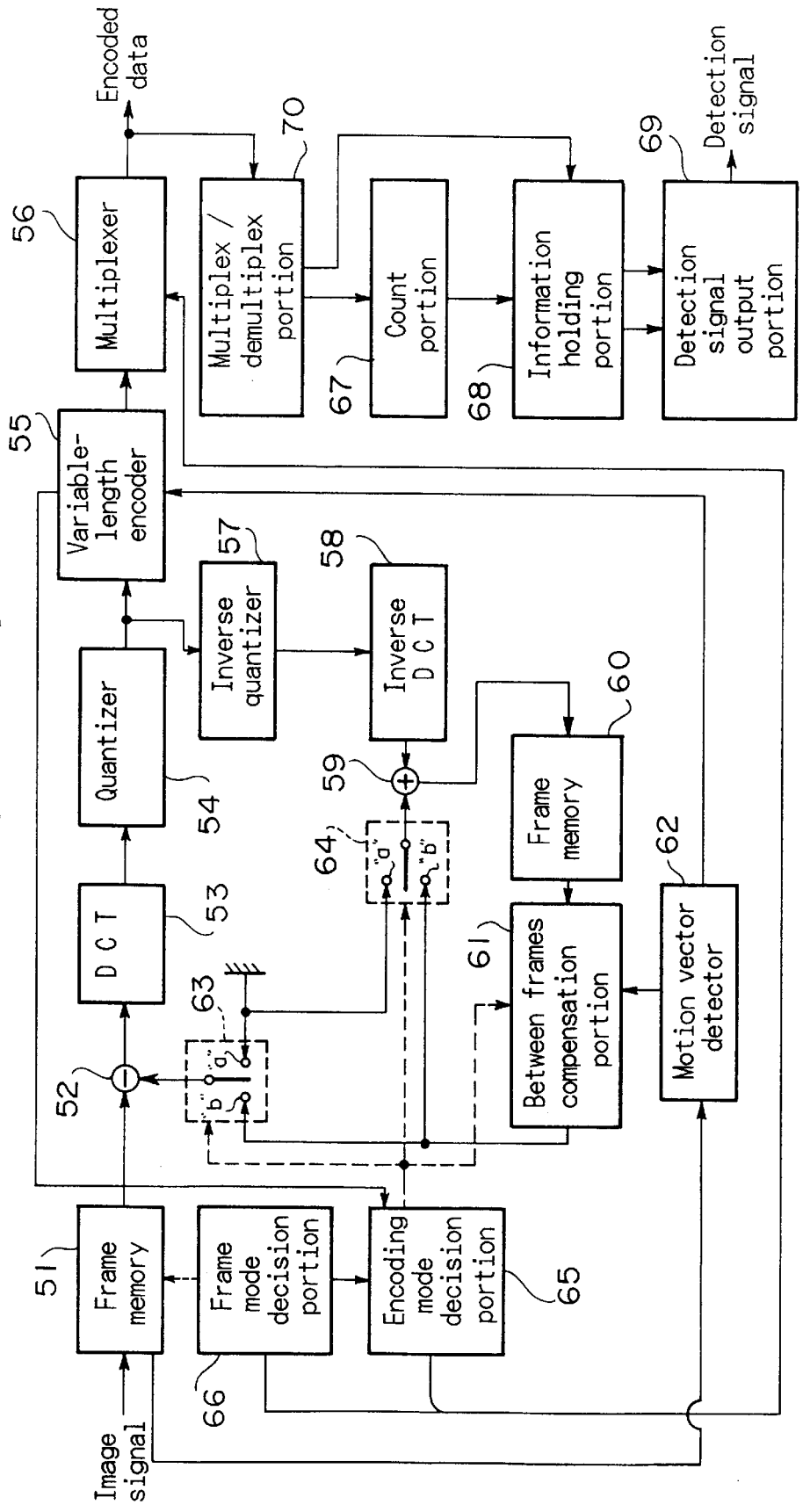
FIG. 23 is a block diagram showing the constitution of embodiment 37 according to the present invention.

FIG. 23 is a block diagram which shows the constitution of an embodiment according to the present invention. In this case also, it is expected that the MPEG system is used for the encoder portion of a moving image; same symbols are given to the similar portions to those shown in FIG. 21 and the explanation of them will be omitted. In the figure, 70 is a multiplex/demultiplex portion which demultiplexes and extracts the frame mode data showing the kind of the frame of a moving image from among the first to the third frames, and the data showing the kind of the encoding mode being used presently from among the encoding modes of the first to the fourth from the encoded data output from the multiplexer 56, and transmits the information to the information holding portion 68 or to the count portion 67.

Next, operation will be explained. The encoded data output from the multiplexer 56 are transmitted to the exterior and also they are input to the multiplex/demultiplex portion 70. The multiplex/demultiplex portion 70 extracts and separates the data showing a frame mode and the data showing an encoding mode from the input encoded data and outputs the encoding mode data to the count portion 67 and the frame mode data to the information holding portion 68. After that, a detection processing of a scene-change is executed by the count portion 67, the information holding portion 68 and the detection signal output portion 69 in the similar procedures to those of the embodiment 36, and a detection signal is output.

Embodiment 38

FIG. 24 is a block diagram showing another embodiment according to the present invention, and in this case, in the moving image decoder portion, it is expected that a moving image encoded by the MPEG system is to be decoded, and the same symbols are given to the similar portions to those shown in Fig.23, and the explanation of them is omitted. In the FIGURE, 71 is a variable-length decoder for decoding the variable-length encoded data which are obtained by demultiplexing the frame mode data and the encoding mode data from the encoded data by the multiplex/demultiplex portion 70.

Next, operation will be explained. The encoded data input from the exterior are separated into variable-length encoded data, frame mode data and encoding mode data, and the variable-length encoded data are sent to the variable-length data decoder 71 to be decoded. Among the decoded results by the variable-length data decoder 71, the DCT coefficient is inverse-DCT processed by the inverse transducer 58 and a prediction error signal is decoded through the inverse quantizer 57; the prediction signal between frames which is given from the switch 64 is added the above-mentioned signal in the adder 59, and output to the exterior as an image signal. The output of the adder 59 is stored in the frame memory 60 and utilized for generating an prediction signal between frames.

A motion vector decoded by the variable length data detector 71 is given to the between frames prediction portion 61. The prediction portion 61 is controlled by the motion vector and the data based on the frame mode data and the encoding mode data separated by the multiplex/demultiplex portion 70, and reads-out the data to be used for the prediction between frames from the frame memory 60, and generates a prediction signal between frames for supplying the signal to the switch 64. The switch 64 is subjected to the control of the multiplex/demultiplex portion 70 based on the frame mode data and the encoding mode data, and when the frame mode is the first frame, the contact point on "a" side is made ON and an earthing signal is output. When the frame mode is the second or the third frame, and if the encoding mode is the first encoding mode, the contact point on "a" side is made ON and an earthing signal is output from the switch 64; if the encoding mode is other mode than the first encoding mode, the contact point on "b" side is made ON and the output of the between frames prediction portion 61 is output from the switch 64.

In the FIGURE, the detection mechanism for detecting a scene-change is the same as that shown in the embodiment 37. In other words, the multiplex/demultiplex portion 70 extracts and separates the frame mode data and the encoding mode data from the input encoded data, and delivers the encoding mode data to the count portion 67 and the frame mode data to the information holding portion 68. After that, a detection processing of a scene-change is executed by the count portion 67, information holding portion 68 and the detection signal output portion 69 in the similar procedures to those of the embodiment 36, and a detection signal is output.

Embodiment 39

The embodiment 36, the embodiment 37 and the embodiment 38 can be realized by either means of hardware or software. When the embodiment is to be constituted by hardware, it is possible by using a counter as the count portion 67, a ratch or a memory as the information holding portion, a combination of a comparator, a multiplier, and an adder as a detection signal output portion. The embodiment 36, the embodiment 37 and the embodiment 38 can be realized by handling the frame mode data and the encoding mode data between the hardware units described in the above and the hardware units for executing moving image encoding and decoding. On the other hand, when the embodiments are to be realized by software, the count portion 67, the information holding portion and the detection signal output portion can be realized by a simple computer mechanism being composed of a CPU, a control memory and a data memory, and the embodiment 36, the embodiment 37 and the embodiment 38 can be realized by handling frame mode data and encoding mode data between the above-mentioned CPU mechanism and hardware units which executes moving image encoding and decoding.

It is also possible to realize all units and sections such as a moving image encoding and decoding, detection mechanism for detecting a scene-change, that is, the count portion 67, the information holding portion 68 and the detection signal output portion 69 with a computer as software. In this case, it will be needless to say that the embodiment 36, the embodiment 37 and the embodiment 38 can be realized by only a computer without using special hardware.

What is claimed is:

1. A scene-change detector for detecting a scene-change of a moving image composed of a plurality of frames, comprising, a means for determining an encoding mode of encoded data of each of a plurality of split areas from among a plurality of potential encoding modes, said split areas dividing each of said plurality of frames of said moving image;

a means for counting a number of occurrences of each of said plurality of encoding modes of the encoded data;

a means for determining a frame mode for each frame from among a plurality of frame modes, each of the plurality of frame modes being defined by a set of the plurality encoding modes which are used for encoding split areas in a frame of the frame mode ;

a means for storing data of said number of occurrences of each encoding mode and data of corresponding frame modes for at least two frames; and a means for outputting a signal showing a scene-change when said stored number of occurrences and said stored corresponding frame modes are in accordance with one of a plurality of a predetermined conditions.

2. A scene-change detector described in claim 1, wherein said plurality of encoding modes include a first encoding mode for encoding said moving image using the information of a present frame, a second encoding mode for encoding said moving image using information of a frame already encoded and positioned in past on a time axis, a third encoding mode for encoding said moving image using information of a frame already encoded and positioned in future on the time axis, and a fourth encoding mode for encoding said moving image using information of a frame already encoded and positioned in past on the time axis and information of another frame already encoded and positioned in future on the time axis.

3. A scene-change detector described in claim 2, wherein said plurality of frame modes include a first frame mode for encoding using only said first encoding mode, a second frame mode for encoding using either of said first encoding mode or said second encoding mode, and a third frame mode encoded using any encoding mode selected from among said first to fourth encoding modes.

4. A scene-change detector described in claim 1, wherein said detector further comprises a means for demultiplexing the data showing a kind of a used encoding mode from an input signal including moving image data.

\* \* \* \* \*